(12) United States Patent
Schmidt-Karaca

(10) Patent No.: US 11,063,744 B2
(45) Date of Patent: Jul. 13, 2021

(54) DOCUMENT FLOW TRACKING USING BLOCKCHAIN

(71) Applicant: SAP SE, Walldorf (DE)

(72) Inventor: Markus Schmidt-Karaca, Heidelberg (DE)

(73) Assignee: SAP SE, Walldorf (DE)

( * ) Notice: Subject to any disclaimer, the term of this patent is extended or adjusted under 35 U.S.C. 154(b) by 461 days.

(21) Appl. No.: 15/789,432

(22) Filed: Oct. 20, 2017

(65) Prior Publication Data

US 2019/0123889 A1   Apr. 25, 2019

(51) Int. Cl.
*H04L 9/32* (2006.01)
*H04L 9/06* (2006.01)
(Continued)

(52) U.S. Cl.
CPC ............ *H04L 9/0618* (2013.01); *G06F 16/93* (2019.01); *H04L 9/3236* (2013.01);
(Continued)

(58) Field of Classification Search
CPC ......... G06F 21/6227; G06F 2221/2017; G06F 21/60; H04L 29/06666; H04L 29/08198;
(Continued)

(56) References Cited

U.S. PATENT DOCUMENTS 9,396,174 B1 *  7/2016  Alves .................... G06F 16/93
2003/0023657 A1  1/2003  Fischer et al.
(Continued)

FOREIGN PATENT DOCUMENTS

BE    2016005966    * 12/2016

OTHER PUBLICATIONS

Choudhury et al, Copyright Protection for Electronic Publishing Over Computer Networks, Jun. 1995, IEEE, issue 3, vol. 9, pp. 12-20.*

(Continued)

*Primary Examiner* — Luu T Pham
*Assistant Examiner* — Jenise E Jackson
(74) *Attorney, Agent, or Firm* — Klarquist Sparkman, LLP

(57) ABSTRACT

Techniques and solutions are described for recording document transactions in a blockchain. Document transactions can include sending or receiving a document, or various workflow steps involving a document. Other steps in a workflow that includes a document can be recorded in the blockchain. Blockchain entries related to a document can include a unique identifier of the document, such as a hash value. When a document is sent between two computing systems, the document can be encrypted using a public encryption key of the receiving computing system. Sending and receiving of documents, and recording of blockchain transactions, can be facilitated by an intermediary service. A service providing recording of blockchain transactions can abstract recording details from applications calling the service. A party having the unencrypted document, or the unique document identifier (such as legitimately retaining or receiving the identifier), can retrieve a transaction history of the document from the blockchain.

22 Claims, 13 Drawing Sheets

(51) Int. Cl.
*H04L 29/06* (2006.01)
*G06F 16/93* (2019.01)

(52) U.S. Cl.
CPC ........ *H04L 9/3297* (2013.01); *H04L 63/0442* (2013.01); *H04L 2209/38* (2013.01)

(58) Field of Classification Search
CPC ... H04L 9/0618; H04L 9/3236; H04L 9/3297; H04L 63/0442
USPC .......................................................... 713/178
See application file for complete search history.

(56) References Cited

U.S. PATENT DOCUMENTS

| | | | |
|---|---|---|---|
| 2003/0037254 | A1 | 2/2003 | Fischer et al. |
| 2003/0046017 | A1 | 3/2003 | Fischer et al. |
| 2003/0046448 | A1 | 3/2003 | Fischer et al. |
| 2003/0055927 | A1 | 3/2003 | Fischer et al. |
| 2003/0056207 | A1 | 3/2003 | Fischer et al. |
| 2004/0177361 | A1 | 9/2004 | Bernhard et al. |
| 2004/0199611 | A1 | 10/2004 | Bernhard et al. |
| 2004/0230670 | A1 | 11/2004 | Schmidt-Karaca et al. |
| 2005/0289350 | A1 | 12/2005 | Schmidt-Karaca |
| 2006/0005017 | A1* | 1/2006 | Black .................. H04L 63/0428 713/165 |
| 2007/0027866 | A1 | 2/2007 | Schmidt-Karaca |
| 2008/0082575 | A1 | 4/2008 | Peter et al. |
| 2009/0106371 | A1 | 4/2009 | Schmidt-Karaca et al. |
| 2009/0106372 | A1 | 4/2009 | Schmidt-Karaca et al. |
| 2009/0106373 | A1 | 4/2009 | Schmidt-Karaca et al. |
| 2010/0121924 | A1 | 5/2010 | Schmidt-Karaca |
| 2011/0145571 | A1 | 6/2011 | Schmidt-Karaca et al. |
| 2011/0154445 | A1 | 6/2011 | Schmidt-Karaca et al. |
| 2012/0133553 | A1 | 5/2012 | Schmidt-Karaca et al. |
| 2012/0136839 | A1 | 5/2012 | Eberlein et al. |
| 2013/0166417 | A1 | 6/2013 | Pulkowski et al. |
| 2013/0167135 | A1 | 6/2013 | Neumann et al. |
| 2017/0126702 | A1* | 5/2017 | Krishnamurthy ..... H04L 63/123 |
| 2017/0220815 | A1* | 8/2017 | Ansari ................. G06Q 20/389 |
| 2017/0236130 | A1* | 8/2017 | Kee ..................... G06F 21/6227 705/7.26 |
| 2017/0364552 | A1* | 12/2017 | Pattanaik .............. H04L 9/3297 |
| 2018/0012311 | A1* | 1/2018 | Small .................. G06Q 30/0185 |
| 2018/0075422 | A1* | 3/2018 | Jayaram ............... G06Q 20/108 |
| 2018/0082043 | A1* | 3/2018 | Witchey ................. G16H 10/40 |
| 2018/0114045 | A1* | 4/2018 | Ebrahimi .............. H04L 9/0618 |
| 2018/0225640 | A1* | 8/2018 | Chapman ........... G06Q 20/0855 |
| 2018/0225660 | A1* | 8/2018 | Chapman ........... G06Q 20/3827 |
| 2018/0247302 | A1* | 8/2018 | Armstrong .......... H04L 63/0471 |
| 2018/0268162 | A1* | 9/2018 | Dillenberger ....... G06F 16/2379 |
| 2018/0285971 | A1* | 10/2018 | Rosenoer ............... G06N 20/00 |
| 2019/0013934 | A1* | 1/2019 | Mercuri ................. G06F 16/27 |
| 2019/0013948 | A1* | 1/2019 | Mercuri .................. G06F 9/546 |
| 2019/0044727 | A1* | 2/2019 | Scott ..................... H04L 9/3247 |
| 2019/0087792 | A1* | 3/2019 | Chow ................ G06Q 20/0655 |
| 2019/0347444 | A1* | 11/2019 | Lowagie ............... H04L 9/3073 |
| 2019/0354724 | A1* | 11/2019 | Lowagie ................. G06F 21/31 |
| 2020/0184095 | A1* | 6/2020 | Ansari ................ G06F 21/6227 |

OTHER PUBLICATIONS

Bocek et al, Blockchains Everywhere—A Use-Case of Blockchain in the Pharma Supply-Chain, 2017, IEEE, pp. 772-777.*
"A Silver Lining Over Bolzano's Building Authority", retrieved from https://news.sap.com/a-silver-lining-over-bolzanos-building-authority/ on or before Oct. 2017, 6 pages.
"Address and key format", retrieved from https://www.multichain.com/developers/address-key-format/ on or before Oct. 2017, 3 pages.
Ainger, N., "SAP Unveils Blockchain Service in the Cloud", retrieved from https://www.cnbc.com/2017/05/17/sap-unveils-blockchain-service-in-the-cloud.html on or before Oct. 2017, 5 pages.
Baliga, A., "Understanding Blockchain Consensus Models", retrieved from https://www.persistent.com/wp-content/uploads/2017/04/WP-Understanding-Blockchain-Consensus-Models.pdf on or before Oct. 2017, 14 pages.
"Block", retrieved from https://en.bitcoin.it/wiki/Block on or before Oct. 2017, 3 pages.
"Block hashing algorithm", retrieved from https://en.bitcoin.it/wiki/Block_hashing_algorithm on or before Oct. 2017, 3 pages.
"Blockchain", retrieved from https://en.wikipedia.org/wiki/Blockchain on or before Oct. 2017, 22 pages.
"Blockchains & Distributed Ledger Technologies", retrieved from https://blockchainhub.net/blockchains-and-distributed-ledger-technologies-in-general/ on or before Oct. 2017, 13 pages.
"Build and Extend Workflows with SAP Cloud Platform Workflow", retrieved from https://cloudplatform.sap.com/capabilities/integration/workflow-service.html on or before Oct. 2017, 6 pages.
Del Castillo, M., "Multichain 1.0: Bitcoin Compatible Blockchain Opens for Enterprise", retrieved from https://www.coindesk.com/multichain-1-0-bitcoin-compatible-private-blockchain-launches-for-enterprise/ on or before Oct. 2017, 8 pages.
"Digital Signature Algorithm", retrieved from https://en.wikipedia.org/wiki/Digital_Signature_Algorithm on or before Oct. 2017, 5 pages.
"Digital Signatures", *The GNU Privacy Handbook*, Chapter 2, Concepts, retrieved from https://www.gnupg.org/gph/en/manual/x215.html on or before Oct. 2017, 2 pages.
"Digital Signature Standard (DSS)", retrieved from https://oag.ca.gov/sites/all/files/agweb/pdfs/erds1/fips_pub_07_2013.pdf on or before Oct. 2017, 130 pag.
"Digitizing Government with Blockchain and SAP", 1:47 minute YouTube video, retrieved from https://www.youtube.com/watch?v=wxp74vVvfec on or before Oct. 2017, 4 pages.
Fien-Schmalzbauer, B.,"Want to know how the autonomous region Bolzano is using blockchain?", retrieved from https://www.linkedin.com/pulse/want-know-how-autonomous-region-bolzano-using-fien-schmalzbauer on or before Oct. 2017, 2 pages.
Galer, S., "Blockchain Could Be a Game-Changer But Not Because It's Cool Technology", retrieved from https://www.forbes.com/sites/sap/2017/03/15/blockchain-could-be-a-game-changer-but-not-because-its-cool-technology/#1f636c8a6c51 on or before Oct. 2017, 3 pages.
"How can I look up a transaction on the blockchain?" retrieved from https://support.blockchain.com/hc/en-us/articles/211160663-How-can-I-look-up-a-transaction-on-the-blockchain—on or before Oct. 2017, 2 pages.
"How Your Wallet Works", retrieved from https://blockchain.info/wallet/how-it-works on or before Oct. 2017, 6 pages.
"How does hashing work?", retrieved from https://security.stackexchange.com/questions/33860/how-does-hashing-work on or before Oct. 2017, 10 pages.
"Inside Bitcoin's Blockchain", retrieved from https://bitsonblocks.files.wordpress.com/2015/09/bitcoin_blockchain_infographic1.pdf on or before Oct. 2017, 1 page.
"Merkle Tree", retrieved from https://en.wikipedia.org/wiki/Merkle_tree on or before Oct. 2017, 5 pages.
"Multi chain vs block chain", retrieved from https://www.multichain.com/qa/3740/multi-chain-vs-block-chain on or before Oct. 2017, 1 page.
Nielson et al. "Review of the 6 Major Blockchain Protocols", retrieved from https://richtopia.com/emerging-technologies/review-6-major-blockchain-protocols on or before Oct. 2017, 6 pages.
O'Connell, C. "Cloud Foundry Now Generally Available on SAP Cloud Platform", retrieved from https://www.cloudfoundry.org/cloud-foundry-now-generally-available-sap-cloud-platform/ on or before Oct. 2017, 11 pages.
Sethi, A., "Introduction to Multichain: Blockchains" retrieved from https://dzone.com/articles/introduction-to-multichainnbspblockchains on or before Oct. 2017, 3 pages.
"SHA-1", retrieved from https://en.wikipedia.org/wiki/SHA-1 on or before Oct. 2017, 15 pages.
"Target", retrieved from https://en.bitcoin.it/wiki/Target on or before Oct. 2017, 2 pages.

(56) References Cited

OTHER PUBLICATIONS

"Technical background of version 1 Bitcoin addresses", retrieved from https://en.bitcoin.it/wiki/Technical_background_of_version_1_Bitcoin_addresses on or before Oct. 2017, 4 pages.

Thompson, C., "How does the Blockchain Work? (Part 1)", retrieved from https://medium.com/blockchain-review/how-does-the-blockchain-work-for-dummies-explained-simply-9f94d386e093 on or before Oct. 2017, 8 pages.

Wähner, K., "Blockchain—The Next Big Thing for Middleware", retrieved from https://www.infoq.com/articles/blockchain-middleware on or before Oct. 2017, 30 pages.

"What's the process of Creating a Block on the BlockChain?", retrieved from https://bitcoin.stackexchange.com/questions/7330/whats-the-process-of-creating-a-block-on-the-blockchain on or before Oct. 2017, 2 pages.

"Why are hash functions one way?", retrieved from https://security.stackexchange.com/questions/11717/why-are-hash-functions-one-way-if-i-know-the-algorithm-why-cant-i-calculate-t/19658#19658 on or before Oct. 2017, 9 pages.

"Why use multi chain instead of a blockchain or a normal Internal Database", retrieved from https://www.multichain.com/qa/1481/why-multi-chain-instead-blockchain-normal-internal-database on or before Oct. 2017, 2 pages.

Zaninotto, F., "The Blockchain Explained to Web Developers, Part 1: The Theory", retrieved from https://marmelab.com/blog/2016/04/28/blockchain-for-web-developers-the-theory.html on or before Oct. 2017, 21 pages.

Zyskind, G. "What is hash target in relation to blockchain and mining?", retrieved from https://www.quora.com/What-is-hash-target-in-relation-to-blockchain-and-mining on or before Oct. 2017, 3 pages.

\* cited by examiner

DOCUMENT FLOW TRACKING USING BLOCKCHAIN

FIELD

The present disclosure generally relates to document tracking. Particular implementations relate to tracking the flow of a document, or actions taken regarding the document (such as in a workflow), by recording document flow or other actions in a blockchain.

BACKGROUND

Many processes involve the transfer of sensitive information between individuals, including individuals working in different departments of an organization, between different organizations, and between private individuals and one or more organizations. These processes and documents transfers can raise various concerns. For example, it can be important to track what actions were taken with information, when the actions were taken, and by whom. It can be important that even this tracking information is not available to unauthorized individuals, and that the integrity of the tracking information be maintained.

Current workflow and document tracking technologies can suffer from various drawbacks. For instance, different organizations, and even different departments within an organization, may use different workflow and document management systems, including systems for tracking documents, which can lead to interoperability issues. If document tracking information is under the control of a single individual or entity, the information may be subject to deletion or modification, thus compromising its integrity. The documents themselves may also be subject to modification, and it can be time consuming to verify the integrity of the document contents or tracking information, particularly at multiple instances during the lifecycle of a document. Accordingly, room for improvement exists in the area of document and workflow tracking.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for recording document transactions in a blockchain. Document transactions can include sending or receiving a document, or various workflow steps involving a document. Other steps in a workflow that includes a document can be recorded in the blockchain. Blockchain entries related to a document can include a unique identifier of the document, such as a hash value. When a document is sent between two computing systems, the document can be encrypted using a public encryption key of the receiving computing system. Sending and receiving of documents, and recording of blockchain transactions, can be facilitated by an intermediary service. A service providing recording of blockchain transactions can abstract recording details from applications calling the service. A party having the unencrypted document, or the unique document identifier, can retrieve a transaction history of the document from the blockchain.

A method is provided for recording a first user-transaction with a document (such as with a digital version of a physical document) in a blockchain. In various examples, the first user-transaction can be an action of sending or receiving the document, or a workflow action that involves the document (such as approving the document or generating an analysis or summary of the document). The request to record the first user-transaction is received. The request includes a unique document identifier generated from content of the document, such as a hash value of the document, a unique identifier of a user requesting the action, and a time associated with the request, such as a time the document was sent or received. The first user-transaction is caused to be written in a blockchain transaction record.

According to another embodiment, a method is provided for retrieving a transaction history of a digital document (such as a digital version of a physical document) having a unique document identifier generated from content of the document, such as a hash value. A request is received to retrieve the transaction history of the digital document. The request includes the unique document identifier. A blockchain query is generated, where the query is to identify blockchain transactions having the unique document identifier. The blockchain query is caused to be executed on a blockchain. Query execution results are received. The query execution results include a unique user identifier (such as an identifier of a user who requested a transaction recorded in the blockchain, or who is otherwise associated with the transaction), a transaction type identifier, and a time associated with the transaction (such as a time an action associated with the transaction was requested or was executed). At least a portion of the query execution results are displayed.

According to a further embodiment, a method is provided for receiving and sending an encrypted document (such as an encrypted digital document, which can be a version of a physical document), where the receiving and sending are recorded in a blockchain. The encrypted document is received from a first client computing system. The document is encrypted with a public encryption key of a second client computing system. The receiving is recorded in a blockchain transaction. The blockchain transaction includes a hash value of an unencrypted version of the encrypted digital document, a unique identifier of the first client computing system, a unique identifier of the second client computing system, and a time associated with the receiving. The encrypted digital document is sent to the second client computing system. The sending is recorded in a blockchain transaction. The blockchain transaction for the sending includes the hash value of the digital document, the unique identifiers of the first and second client computing systems, and a time associated with the sending.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1

Overview

Figure 1:
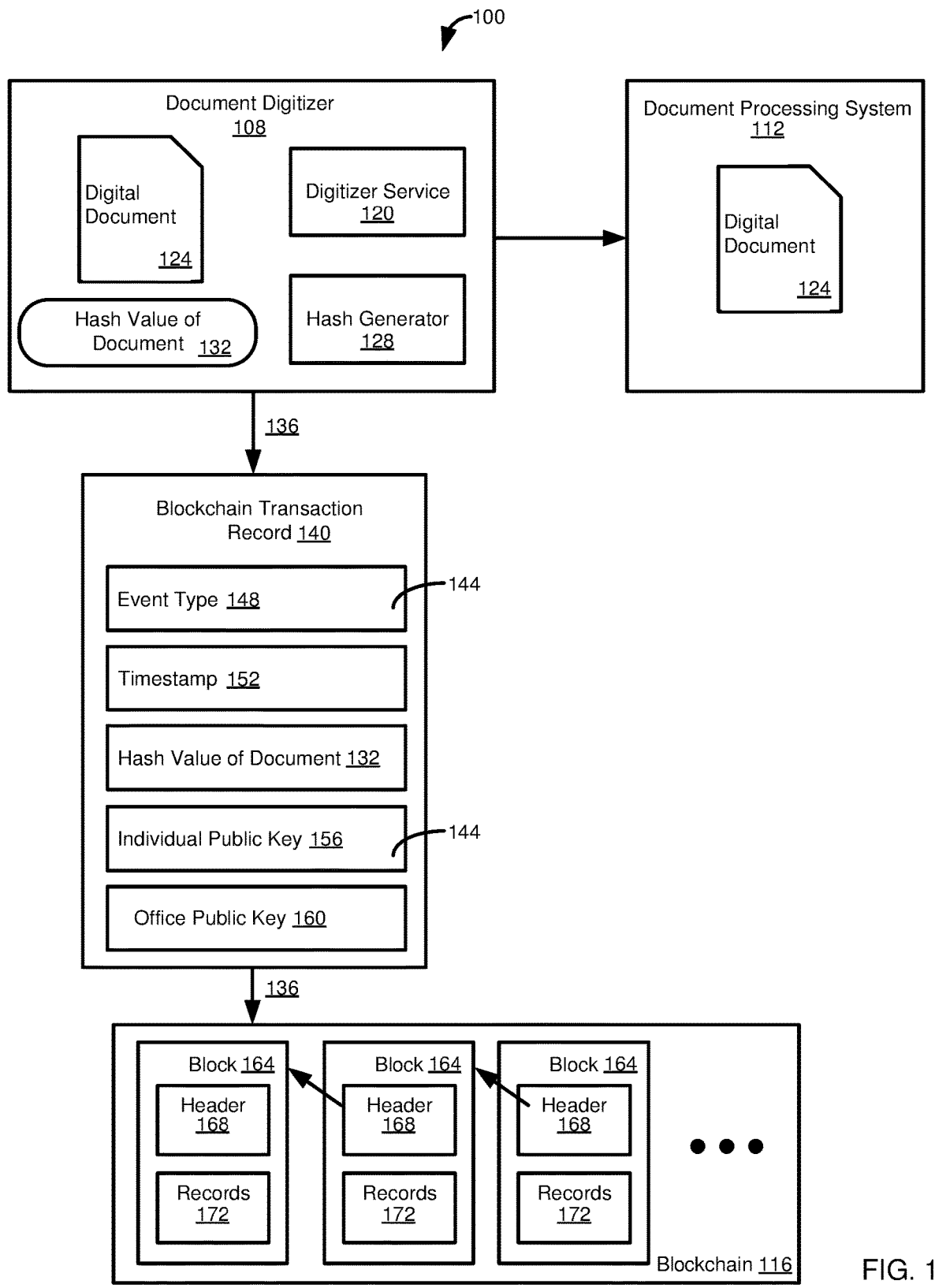
FIG. 1 is a schematic diagram of a scenario for entering a digital document in a tracking system, including writing a blockchain transaction for digitizing the document or otherwise entering the document in the tracking system.

Many processes involve the transfer of sensitive information between individuals, including individuals working in different departments of an organization, between different organizations, and between private individuals and one or more organizations. These processes and documents transfers can raise various concerns. For example, it can be important to track what actions were taken with information, when the actions were taken, and by whom. It can be important that even this tracking information is not available to unauthorized individuals, and that the integrity of the tracking information be maintained.

Current workflow and document tracking technologies can suffer from various drawbacks. For instance, different organizations, and even different departments within organizations, may use different workflow and document management systems, including systems for tracking documents, which can lead to interoperability issues. If document tracking information is under the control of a single individual or entity, the information may be subject to deletion or modification, thus compromising its integrity. The documents themselves may also be subject to modification, and it can be time consuming to verify the integrity of the document contents or tracking information, particularly at multiple instances during the lifecycle of a document.

The present disclosure employs blockchain technology to track the flow of data, such as data from a document, as it passes between various stages in a workflow, including between different individuals, such as a private individual and an organization, between different departments in an organization, between different organizations, or a combination thereof. In a blockchain, a plurality of individual transaction are written in a record, or a block. Periodically, a block is completed and added to a chain of prior blocks. That is, each new block includes the hash value of the prior block, as well as information regarding the transactions included in the newly-written block. Blocks typically include a Merkle root (a hash value of all of the transactions in the block) in their header, with the body of the block containing the underlying transaction data (in a Merkle tree).

Blockchains are typically part of a distributed, peer to peer network. At least a portion of the peers, sometimes referred to as "miners," are involved in the process of forming new blocks. In blockchain networks such as Bitcoin, individual computer nodes ("miners") compete to write new blocks, and receive Bitcoins in return for completing blocks. Other types of blockchains, including private blockchains, may employ varying numbers of writers to keep the blockchain operational, but may not remunerate the writers for these activities (e.g., in a private blockchain, writers may be provided by one or more of the entities that are members of, or otherwise permitted to access, the blockchain, or by a software or infrastructure provider).

Each entity participating in a blockchain typically maintains a copy of the entire blockchain, although in some cases entities may maintain portions of a blockchain. However, the blockchain is typically maintained by multiple computing nodes. Maintaining the blockchain in multiple nodes can provide a number of benefits. For example, as the blockchain is distributed, there is no single point of failure for the information in the blockchain, as compared with, for example, a centralized database. In addition, because the blockchain is distributed, and because the blocks are linked together in a chain, blockchains can provide a high level of data integrity. For instance, the data in an earlier block in a chain cannot typically be changed without also changing the data in the subsequent blocks, as the hash value of the subsequent blocks depends on the contents of earlier blocks.

In one aspect, the present disclosure provides for writing entries in a blockchain upon certain actions being taken with data, such as a collection of data, for example a document. In particular implementations, blockchain transactions are written when a document is sent from one entity (an individual or organization) to another entity, or when a document is received by one entity from another entity. The blockchain transaction can include an identifier for the sending entity and an identifier for the receiving entity, as well as a timestamp (such as when the document was sent or when it was received). The blockchain transaction can also include a hash value of the document itself.

Including the hash value of the document itself in the blockchain transaction can provide various benefits. For instance, unless an individual has access to the document (or otherwise has access to the hash value of the document), they will not be able to generate the hash value, and will not be able to retrieve the transaction history for the document. Similarly, the document itself cannot be identified or retrieved from the blockchain record alone. That is, even if the hash value is obtained, and transaction records retrieved, the content of the document is still protected.

Blockchain transactions can be written for actions in addition to, or other than, sending or receiving a document. For example, a transaction can be written when certain workflow steps, such as approval of a document, or entering a document in a workflow, are taken.

Requests to write blockchain transactions for workflow actions can be incorporated into workflow or communication software used by an organization. For instance, a software application that provides access to a document, or data in another format, can include functionality to execute workflow actions, including actions such as accessing or opening a document, approving a document, sending a document, or receiving a document. The functionality can be incorporated into a document management system, or a component of a database system (or program used to access a database system), or in a workflow application. Thus, actions taken by end users, such as employees of an organization, can automatically trigger the writing of blockchain transactions, which can improve the integrity of the data, as the document cannot be processed without generating appropriate tracking information. Blockchain writing and retrieval can be provided as a service, where details of the blockchain technology are abstracted from applications, such as document tracking, document management, or workflow applications.

The disclosed technologies can also include features that provide for secure sending and receiving of a data, such as a document. For instance, the document can be sent and received using a shared service. In some cases, the shared service can be provided by a third party. Having a third party provide a service that provides for document sharing between entities can be useful, as it can provide an additional element to increase data integrity, and can also bridge different systems (such as software applications) used by different entities. For instance, different document management systems can be used by the different entities, but can include calls (such as via remote procedure calls or web services) to the third party document sharing service.

Example 2

Example Recording of Digitization in Blockchain

FIG. 1 is a block diagram of an example architecture 100 in which certain disclosed technologies can be implemented. The architecture 100 includes a document digitizer 108, a document processing system 112, and a blockchain 116.

The document digitizer 108 can include a digitizer service 120. The digitizer service 120 can be used to produce a digital representation of a physical document, such as for generating or receiving an image of the document, and optionally performing, or causing to be performed, various processing steps, such as applying optical character recognition to the image or extracting text or images of the document, such as text or images corresponding to a particular document template associated with the document. In some cases, when a physical document is provided to the digitizer service 120, subsequent use of the document involves the image of the document. In other cases, an electronic record for the document can be used instead of the document image, where the electronic record includes formatted data, such as text or images extracted from the document and assigned to particular fields in a document schema.

The document digitizer 108 can operate with documents already in digital form, such as digital version of physical documents (e.g., analogous to the output of the digitizer service 120) or natively digital documents, such as a document representing entries into an online form, a document associated with one or more database tables, word processing documents, documents in a markup language (e.g., XML or HTML documents), spreadsheet records, or other collections of data. A digital document 124, obtained from the digitizer service 120 or some other source, is processed by a hash generator 128 to generate a hash value 132. The hash value 132 can be, or can be part of, a digital signature for the digital document. Suitable hash algorithms include the SHA-1, SHA-2, and SHA-3 hash algorithms, although other hash algorithms, including secure hash algorithms can be used.

The document digitizer 108 generates a request 136 to write a blockchain transaction corresponding to the digitization of the document 124, or for entry of the digital document into a tracking system (including generating a hash value for the document). A transaction record 140 to be written can include various parameters 144, including an event type indicator 148, a timestamp 152 (e.g., indicating when the event occurred, or when the request 136 was generated), the hash value 132, a public key value 156 of an individual who input the digital document 124 into the tracking system (which can include, for example, taking a physical copy of a document from another individual, such as an individual requesting action or service from an entity, and causing the physical document to be rendered as the digital document), and a public key value 160 of an office or department associated with the intake of the digital document. The public key values 156, 160 can be used to track when the digital document 124 is sent to another individual or office. That is, the transaction record 140 can serve to establish initial possession of, or responsibility for, the digital document 124.

The transaction 140 is written to the blockchain 116. As described above, each block 164 of the blockchain 116 includes a header 168 and transaction records 172. Each header 168 incudes a reference to the immediately preceding block 164 in the blockchain 116. As will be described, at least a portion of subsequent actions with the digital document 124 will also be recorded in the blockchain 116. If a user has access to the digital document 124 (or its hash value 132), and the appropriate hash algorithm, the user can search the blockchain 116 for transaction records 172 corresponding to the digital document.

The digital document 124 can be maintained in the document processing system 112. The document processing system 112 can allow access, including restricting access, to the digital document 124. For instance, the document processing system 112 can restrict access to the digital document 124 to particular individuals or departments authorized to access the digital document.

Example 3

Example Recording of Document Flow Between Offices in a Blockchain

Figure 2:
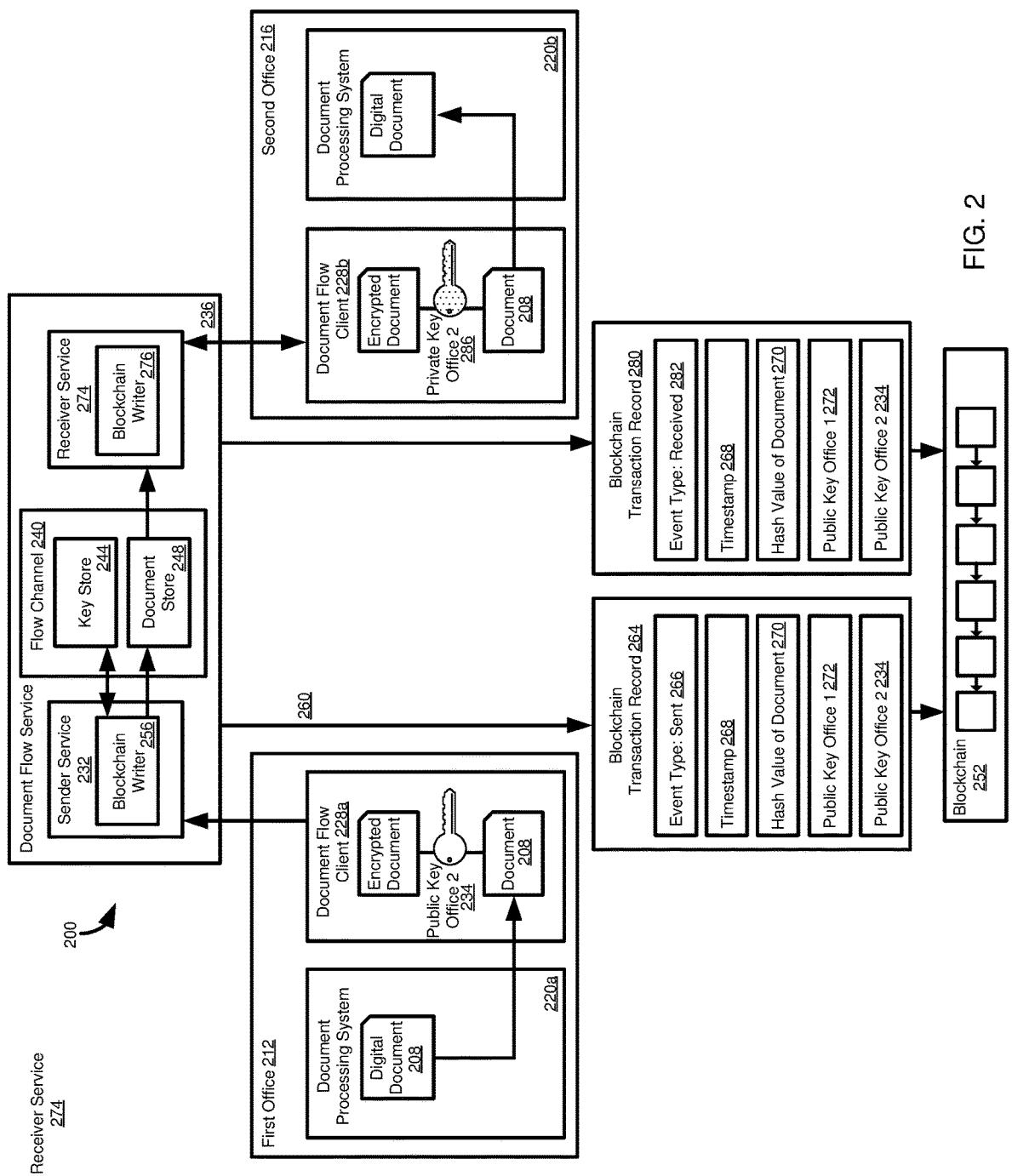
FIG. 2 is a schematic diagram of an architecture that includes a flow service for facilitating the secure transfer of an encrypted digital document between a first office and a second office, where the flow service records blockchain transactions when a digital document is received from the first office and when the digital document is sent to the second office.

FIG. 2 illustrates a scenario 200 where a digital document 208 is transferred between a first office 212 and a second office 216 (e.g., between a computing system of the first office and a computing system of the second office). In some cases, the first office 212 and the second office 216 may be part of the same organization or entity, while in other cases the first and second offices may be parts of different organizations. Similarly, in some cases, the first office 212 and the second office 216 can be located in relatively close proximity (e.g., the same building or corporate campus), while in the other cases the first and second offices can be located remotely from one another.

Each office 212, 216 includes a document processing system 220a, 220b. The document processing system 220a of the first office 212 can include the digital document 208. The digital document 208 can be acquired by the document processing system 220a, in at least some cases, from a physical document as described with reference to FIG. 1. For instance, the document processing system 220a can include, or can be in communication with, a document digitizer, such as the document digitizer 108 of FIG. 1.

The digital document 208 can be sent to, or accessed by, a document flow client 228a. The document flow client 228a can communicate (e.g., over a network, such as the internet) with a sender service 232 of a document flow service 236. The document flow service 236 can define a document flow channel 240 to facilitate documents being sent between the first office 212 and the second office 216. The flow channel 240 can include a key store 244 and a document store 248. The key store 244 can maintain public keys for the offices 212, 216.

In some implementations, the key store 244 can maintain public keys for additional offices, such as all offices serviced by the document flow service 236. However, the document flow service 236 can, if desired, restrict access to particular keys of the key store 244 to particular offices for a defined flow channel. For instance, if a third office exists, but a flow channel is not defined between the first office 212 and the third office, the first office is not permitted to access the public key of the third office. If a flow channel is defined between the second office 216 and the third office, the second office can be permitted to access the public key for the third office, as well as the public key for the first office 212.

When the first office 212 is to send the digital document 208 to the second office 216, the first office can request a public encryption key 234 of the second office from the sender service 232. The sender service 232 sends the public encryption key 234 of the second office 216 to the first office 212, optionally after determining that the first office is authorized to receive the key. For instance, the sender service 232 can determine that the flow channel 240 is defined between the first office 212 and the second office 216. In other cases, the first office 212 does not request the public key 234 of the second office 216 from the sender service 232. In one scenario, the first office 212 already possesses a copy of public key 234 of the second office 216, such as maintaining the key sent as part of a prior request, or sent to the first office 212 as part of a configuration or setup process, including a process that establishes the flow channel 240.

The first office 212 encrypts the digital document 208 using the public key 234 of the second office 216 and sends the encrypted document to the sender service 232. The sender service 232 stores the digital document 208 in the document store 248. The digital document 208 can be stored permanently (or for a substantial period of time) by the document store 248. Or, the digital document 208 can stored more transiently by the document store 248, such as being deleted after the digital document has been sent to the second office 216.

Even if the document store 248 is part of a shared service, accessible by multiple parties, the contents of the digital document 224 are protected against unauthorized access due to the digital document being encrypted with the public key of the second office 216. The document store 248 can also enforce access restrictions for the digital document 208 (e.g., only allowing authorized users of the second office 216 to access the digital document). However, even in the event that the digital document 208 is subject to unauthorized access via the document store 248 (or transmission between the document flow service 236 and the first office 212 or the second office 216), the encryption protects the confidentiality and integrity of the digital document.

In some aspects, the digital document 208 is retained by the first office 212 after the digital document is received in the document store 248, or after the digital document has been retrieved from the document store by the second office 216. For instance, the digital document 208 may be subject to additional processing, or maintained for later access, by the first office 212. The digital document 208 may also be maintained at the first office 212 for archival purposes. When the digital document 208 is maintained at the first office 212, the transaction history of the digital document 224 can be obtained by generating the hash value for the digital document and searching a blockchain 252 in which the transactions were recorded. Or, the information can be retrieved using a stored hash value, even if the digital document is no longer stored by the first office 212.

In other aspects, the digital document 224 is not retained by the first office 212. For instance, the digital document 208 may be deleted from the document processing system 220a or document flow client 228a after the digital document is successfully sent to the sender service 232, or retrieved by the second office 216. Deleting the digital document 208 from the first office 212 can be useful, such as in establishing that later alteration or unauthorized access to the digital document did not result from actions taken at the first office. In other instances, the digital document 208 may be maintained by the first office 212 for a period of time after the digital document is sent to the sender service 232 or retrieved by the second office 216, such as in accordance with a data retention policy or to comply with legal constraints regarding the digital document, but is deleted from the document processing system 220a and the document flow client 228a after a period of time. When the right to maintain the digital document 208 at the first office 212 has expired, the document can be deleted from the document processing system 220a and the document flow client 228a.

Even if the digital document 208 is sent to the document flow service 236 and deleted from a computing system of the first office 212, the first office can maintain the hash value of the digital document. Thus, individuals associated with the first office 212 can check the transaction history of the digital document 208, such as to determine whether the digital document was properly processed, or to determine a current processing stage associated with the digital document, even if the first office no longer has access to the document itself. In any event, whether the first office 212 has access to the digital document 208 itself, or only its hash value, the first office will only be able to access transaction records associated with the version of the digital document processed by the first office 212. That is, if the digital document 208 is subsequently changed, the hash value of the changed document will be different than the hash value of the original document, and so any entries for the modified document in the blockchain 252 will not normally be accessible to the first office 212 (unless they are linked via information accessible by, or provided to the first office).

However, in some implementations, the first office 212 can be provided access to changed documents, or at least hash values of the changed document, so that the first office 212 has access to a complete transaction history for the digital document 208. For instance, if the second office 216 annotates the digital document 208, the hash value of the annotated digital document may change (if the annotations are made in the document itself, as opposed to metadata associated with the document). The second office 216 can determine an updated hash value for the annotated digital document and send the hash value to the first office 212, including using the flow channel 240. The first office 212 can store the modified hash value in association with an identifier for the digital document 208, along with the original hash value. If an individual or automated process of the first office 212 queries the transaction history of the digital document 208 in the blockchain 252, the blockchain can be queried for transactions associated with the original hash value and the hash value of the modified digital document.

When the sender service 232 receives the request from the first office 212 to send the digital document 208 to the second office 216, the sender service can call a blockchain writer 256. The blockchain writer 256 can issue a request 260 to write a blockchain transaction record 264 to the blockchain 252. The record 264 can include an event type 266, indicating the transaction was the sending of a document, a timestamp 268, which can indicate when the send request was received (or processed), the hash value 270 of the digital document 208 (which normally should be the same hash value as a hash value generated when the digital document was entered in the first office 212), a public key 272 for the first office 212, and the public key 234 for the second office 216.

The record 264 is written in the blockchain 252, such as by a node of a plurality of distributed nodes forming the members of the blockchain. The format of the record 264 can indicate that the first office 212 was the sending party and the second office 216 was the receiving party. A party in possession of the digital document 208 (and knowing the correct hash algorithm), or the hash value of the digital document, can search the blockchain 252 for transactions involving the digital document, and find the transaction entry indicating that the digital document was sent from the first office 212 to the second office 216.

The digital document 208 stored, at least transiently, in the document store 248 can be sent to the second office 216 by a receiver service 274. In some cases, the digital document 208 can be sent in response to a request by the second office 216 (i.e., the document can be "pulled" by the second office). In other cases, the digital document 208 can be sent automatically from the receiver service 274 to the second office 216 (e.g., the document can be "pushed" to the second office). Variations of these scenarios are possible. For example, the receiver service 274 can notify the second office 216 that the digital document 208 is available, and the second office can send a request to the receiver service to be sent the document.

When the digital document 208 is sent to the second office 216 by the receiver service 274, the receiver service can call a blockchain writer 276 to write a blockchain transaction record 280. The blockchain transaction record 280 can be at least generally analogous to the blockchain transaction record 264, but, a type parameter 282 can indicate that the record is for a document being received, rather than a document being sent, and the timestamp 268 indicates when the document was received by the second office 216 (which can be, for example, the time of an acknowledgment of a network transmission from the receiver service 274 to the second office being complete, or an acknowledgment generated by the second office).

The digital document 208 received by the second office 216 is decrypted with a private key 286 of the second office. The second office 216, using a document flow client 228b, can decrypt the digital document 208 using the private encryption key 286 of the second office. Although not depicted in FIG. 2, in at least some cases, decryption of the digital document 208 by the second office 216 can generate a transaction record that is written to the blockchain 252. The decrypted digital document 208 can be sent from the document flow client 228b to the document processing system 220b of the second office 216.

Although FIG. 2 illustrates a first office 212 and a second office 216, the scenario 200 can include a larger number of offices. In the event the digital document 208 is sent between multiple offices (either from one office to multiple offices in a single transaction, or as a series of transactions between offices), the above described protocol can be followed, with transaction records being written for pairs of offices involved in sending and receiving of documents (e.g., if a record is sent from the first office 212 to the second office 216 and a third office, separate transaction records can be written for the transaction between the first office and the second office, and for the transaction between the first office and the third office). In other cases, the sending of a document to multiple offices can be written in a single blockchain transaction record (e.g., a record that includes a list of all recipients). Also, although the first office 212 is shown as calling the sender service 232, and the second office 216 calls the receiver service 274, in at least some cases, either office may call the sender service or the receiver service, depending on whether the office is sending or receiving a digital document 208.

By handling communications and transactions with the blockchain 252, the document flow service 236 can abstract the details of transaction logging and transaction retrieval from the first and second offices 212, 216. That is, the first and second offices 212, 216 can request the sending or receiving of documents (and, optionally, other transactions, including workflow transactions), and the sending or receiving (or other transactions) can invoke APIs or similar mechanisms to cause the transactions to be written or retrieved, with the mechanistic details being hidden from the first and second offices.

Example 4

Figure 3:
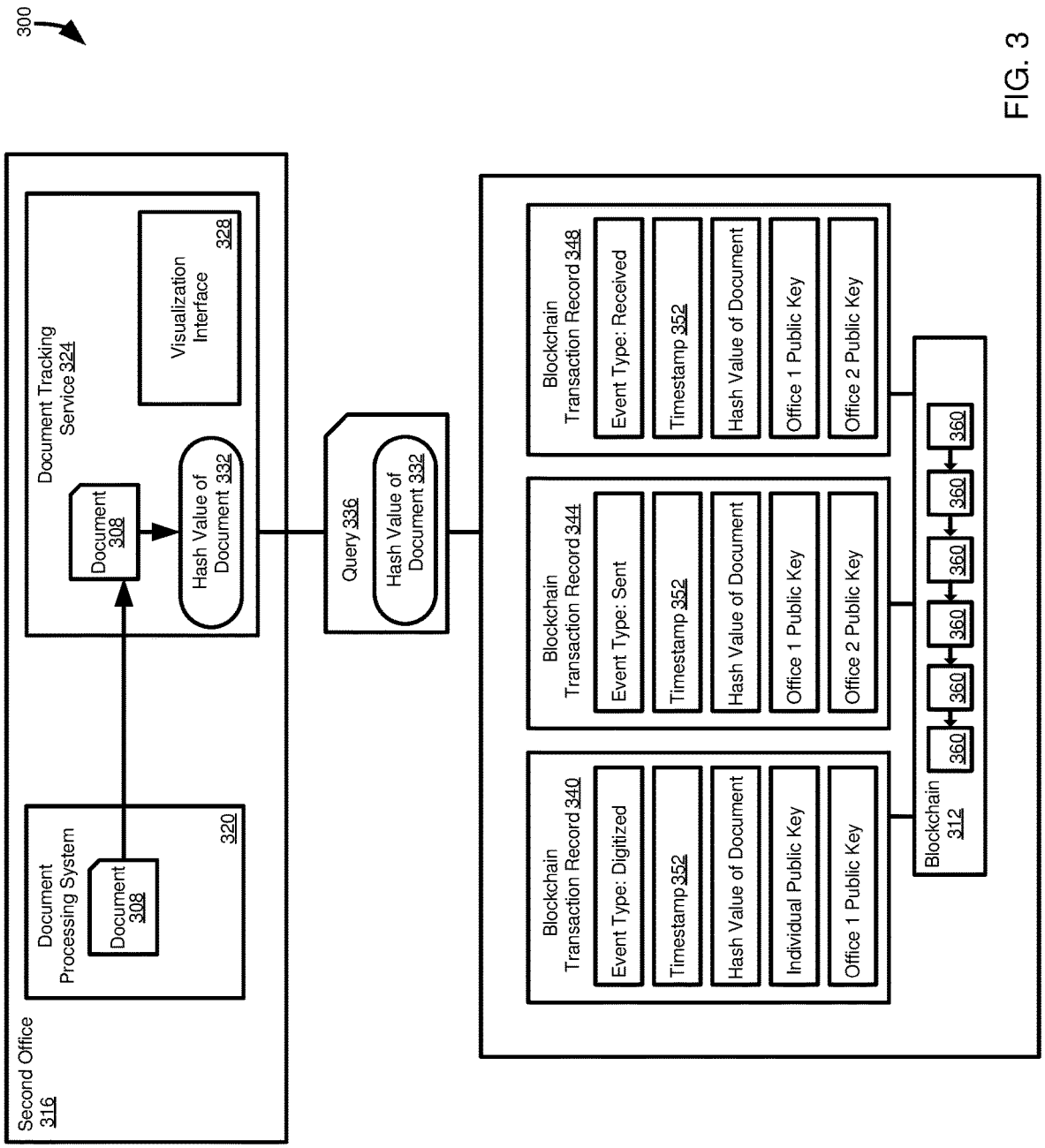
FIG. 3 is a diagram schematically depicting how a document tracking service can include a visualization interface that allows blockchain transaction records associated with a digital document to be retrieved from a blockchain using a hash value of the document.

Example Retrieval and Visualization of Blockchain Transaction Records for a Document FIG. 3 illustrates a scenario 300 where an individual associated with an office can retrieve transaction records associated with a digital document 308 from a blockchain 312. The scenario 300 can be an extension of the scenarios 100 and 200 of FIGS. 1 and 2, where the digital document 308 is sent from a first office (e.g., the first office 212 of FIG. 2, or a computing system of the first office) to a second office 316 (which can be, for example, the second office 216 of FIG. 2, or a computing system of the second office).

The computing environment of the second office 316 can include a document processing system 320 that includes the digital document 308. The digital document 308 can be sent to, or accessed by, a document tracking service 324. The document tracking service 324 can also serve to verify the digital document 308 (e.g. by determining that the hash value is unchanged). The document tracking service can include a visualization interface 328. The visualization interface 328 can provide a user interface that allows a user to request to view the digital document 308 or its tracking information and display requested information to the user.

When a user selects to view tracking information for the digital document 308, the document tracking service 324 can calculate a hash value 332 of the digital document. As explained above, the hash value 332 is preferably calculated in the same manner by a sending system and a receiving system, so that the same hash value represents the same digital document 308. In other cases, the tracking information can be viewed by supply the hash value directly (e.g., if a user does not have, such as no longer having a copy of, the digital document 308, but retains a previously determined hash value of the document, or if the user receives the hash value from an authorized party).

A query 336 is sent from the document tracking service to the blockchain 312. The query 336 includes the hash value 332. The query 336 retrieves blockchain transaction records 340, 344, 348 from the blockchain 312. Information associated with the records 340, 344, 348 is returned to the document tracking service 324, and at least a portion of the information is displayed using the visualization interface 328.

The records 340, 344, 348 correspond, respectively, to an event where the document 308 was digitized (e.g. a paper document was scanned) or otherwise entered into a document processing system, including tracking via the blockchain 312, an event where the document was sent from a first office to the second office 316, and an event where the document was received by the second office 316.

The information in the records 340, 344, 348 can be used for a variety of purposes. For example, processing of the digital document 308 may be associated with various activities, which in turn may be associated with various deadlines. The actions of sending and receiving the digital document 308, reflected in the records 340, 344, 348 can be used to help establish whether a deadline was met, and identify a party that may have been responsible for a missed deadline (or who may be exonerated based on the information). The time difference between the timestamps 352 for when the digital document 308 was digitized (or entered into a tracking system), reflected in record 340, and when the document was sent by the first office, reflected in record 344 can define the time taken by the first office. If the difference in timestamps 352 between the records 340, 344 is less than a threshold value, the first office can be determined to be in compliance with its responsibilities. If difference is higher than the threshold value, an unacceptable delay in processing the digital document may be attributable to the first office.

The information in the records 340, 344, 348 also provides a chain of possession for the digital document 308. In the event an authorized disclosure of the digital document 308 occurs, the information in the records 340, 344, 348 can be used to help identify parties that may have been responsible for the breach. In the scenario of FIG. 3, the records 340, 344, 348 establish that the digital document 308 was in the possession of the first office, the second office 316, and, at least in some implementations, an intermediary service (e.g., the document flow service 236 of FIG. 2). Thus, the source of unauthorized disclosure is traceable to at least one of these three entities. This tracking (particularly when implemented automatically in an application), including the difficulty of bypassing the tracking, or modifying the records 340, 344, 348 can help ensure compliance with protocols regarding the use and possession of the digital documents, as individuals would be aware that their actions are being tracked, and even if an individual attempted to bypass tracking mechanisms (e.g., by printing a hardcopy of the digital document 308 and passing the information to another party, by misusing the document, or by other unauthorized use or sharing of the digital document or the hash value of the digital document), such actions could be eventually traced back to that individual, as the blockchain 312 includes information as to who received the digital document.

The records 340, 344, 348 can also be used to verify the authenticity of the digital document 308. That is, if the digital document 308 were altered, one or more of the records 340, 344, 348 would not be retrieved by the query 336, as the hash value in the query would not match the hash value in records having a prior, unmodified version of the digital document.

Storing the tracking information regarding the digital document 308 in the blockchain 312 in the format of the records 340, 344, 348 can provide further advantages. Even though the blockchain 312 may be publically accessible, or at least more broadly available beyond the first office and the second office 316, the visible information cannot be tied to the digital document 308, as only the hash value 332 is included in the records 340, 344, 348. Thus, the contents of the digital document 308 are not included in the blockchain 312, and even the tracking information regarding the digital document is protected, as it is not traceable to the document without actually having a copy of the document. As blockchain 312 is composed of linked blocks 360, the information in the blockchain is resistant to tampering, as changes to an earlier block would affect information in subsequent blocks. In addition, as the blockchain 312 is typically distributed, there is no central point at which the blockchain can be tampered with, making it more difficult to distribute a blockchain with a modified block 360.

The scenario of FIGS. 1-3 thus provides for end to end tracking of document flow, as well as end to end encryption of the actual document.

Example 5

Example Recordation of Workflow and Document Actions in a Blockchain

Figure 4:
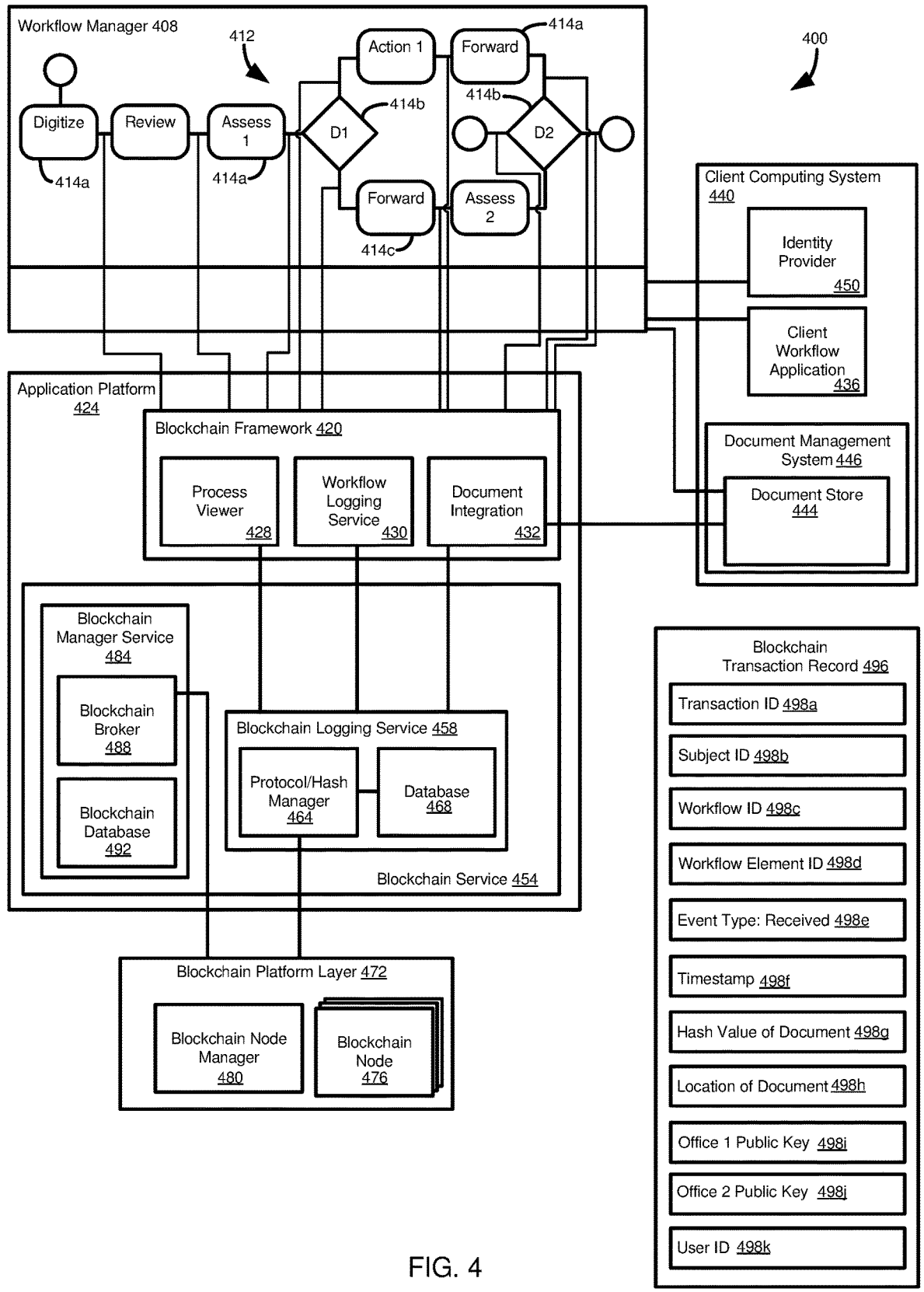
FIG. 4 is a diagram schematically depicting an architecture that provides workflow and document tracking, where workflow and document actions are written in blockchain transaction records.

FIG. 4 illustrates an architecture 400 in which certain disclosed technologies can be implemented. In particular, the architecture 400 can be an architecture where multiple workflow steps, including all workflow steps, can be recorded in a blockchain. For instance, in addition to blockchain transactions being written for instances of a document being digitized (or entered into a tracking system), and when a document is sent to, or received by, an entity or individual, blockchain transactions can be written for transactions by a single individual, or a single entity (which can be at various levels of granularity, such as a single company or a single office or department within a company). Workflows, including workflow steps and transfer of documents, can also include multiple entitles, and tracking information can be collected from multiple entities and accessed by one or more of the multiple entities.

The architecture 400 includes a workflow manager 408, which can be a software application, including a cloud-hosted application that provides tools for modelling workflows and for executing and monitoring workflows. The workflow manager 408 can include application program interfaces that allow other programs to access workflow parameters, create and modify workflows, and update execution details for particular instances of a workflow. For instance, the workflow manager 408 can include APIs for retrieving the workflow and for indicating the status of particular workflow steps (e.g., that a step is incomplete, in process, or complete) or for requesting particular actions be taken for a workflow step (e.g., providing an approval associated with a workflow step or requesting that a document be transmitted or received in accordance with a workflow step. A particular workflow manager 408 can be the SAP Cloud Platform Workflow of SAP SE, of Walldorf, Germany.

The workflow manager 408 is shown as including a workflow 412. The workflow 412 includes various workflow elements 414, including processes or steps 414a and decisions 414b. As shown in FIG. 4, each step 414a, and each outcome of a decision 414b, is linked to a blockchain framework 420 of an application platform 424. The application platform 424 can be a cloud platform, such as the SAP Cloud Platform Cloud Foundry of SAP SE, of Walldorf, Germany.

The blockchain framework 420 can include a process viewer 428, a workflow logging service 430, and a document integration component 432. The process viewer 428 can allow a user to view blockchain transactions associated with the workflow 412. For instance, process 414c is a process to forward a document, such as to another user, office, or entity. The process viewer 428 can access one or more blockchains associated with the workflow 412 to obtain information about the forwarding process 414c. If the forwarding process 414c occurred for a particular document, the process viewer 428 can retrieve a corresponding record from the blockchain and send all or a portion of the information in the transaction to the workflow manager 408, such as to be reflected (such as visually) in the workflow 412. In particular, the workflow 412 can be updated to include (including being displayed to a user of a computing device) information regarding when the document was sent, to whom the document was sent, and who sent the document.

In some cases, the blockchain transaction record can include information regarding one or more workflows with which the document is associated (e.g., via a workflow ID), and optionally an identifier for a particular workflow process or element (e.g., via a workflow element ID) with which the transaction record is associated. The workflow process or element can be indicated in a "transaction type" field, such as the "event type" field of the records 264, 280 of FIG. 2, or the workflow process or element can be indicated in another field of the record. Including a particular element identifier and a transaction type for a blockchain log entry can be beneficial, as it can facilitate queries by transaction type, while allowing specific log entries to be tied to specific workflow steps.

The workflow logging service 430 can process requests to write transaction entries in a blockchain. For instance, when an API method is called by an application, such as a client workflow application 436 on a client computing system 440, or through a web interface, the logging service 430 can extract transaction information from the method call (e.g., an identifier of a particular workflow step associated with the call, a document identifier, a document hash value, or combinations thereof), or using context information associated with the workflow (e.g., an identifier of a current user of the application, an identifier of an office or entity associated with the call, a time the request was received, a document identifier, a workflow identifier, a workflow step identifier, or combinations thereof).

The document integration component 432 can communicate with a document store 444 of a document management system 446 of the client computing system 440. The document integration component 432 can request copies of documents, data from a document, a hash value of a document, or combinations thereof, from the document store 444. The document management system 446 can determine whether the request is authorized, such as whether a user, office, or entity associated with the request is authorized to access the requested document. Determining whether a request for document information is authorized can include accessing credentials provided by an identity provider 450 of the client computing system 440. The identity provider 450 can also regulate access to the workflow 412, and determine what actions a user may take with respect to the workflow. For example, some users may be permitted to carry out particular actions for a workflow element 414 (such as providing an approval or indicating that a process is complete), but not others, or may only be permitted to see certain portions of the workflow.

Although not shown explicitly in FIG. 4, the client computing system 440 can include, or can be in communication with, a database that can store workflow information. In some examples, workflow information (e.g., records regarding workflow instances, or workflow definitions), can be stored in the document management system 446. Workflow elements can trigger the retrieval of information from such a database, including from the document management system 446.

The blockchain framework 420 can be in communication with a blockchain service 454. The blockchain service 454 can include a blockchain logging service 458. The blockchain logging service 458 can include a protocol/hash manager 464 that is in communication with a database 468. The protocol/hash manager 464 can format requests from the blockchain framework 420 into the correct protocol for a particular blockchain used with a workflow 412. For example, different blockchain implementations can include different protocol elements, such as record structures, identifiers/lists of nodes, consensus mechanisms, permissions information (e.g., establishing that the user of the workflow 412 or a particular application is permitted to read or write to a blockchain), transaction validation, hash mechanisms, and any mechanisms for modifying information previously recorded in a blockchain. The various protocol details can be stored in the database 468 and retrieved by the protocol/hash manager 464 as needed. The protocol/hash manager 464 can also determine hash values for a document for which data is to be recorded in a blockchain, or for which the blockchain is to be queried for data.

The protocol/hash manager 464 can be in communication with a blockchain platform layer 472. The blockchain platform layer 472 can include nodes 476 maintaining copies of all or a portion of one or more blockchains. That is, the blockchain platform layer 472 can include multiple blockchains, where a particular node of the nodes 476 can include all or part of one or more of the multiple blockchains. A collection of nodes 476 that maintain the blockchain can form an abstraction of the blockchain (e.g., writing to, or reading from, the blockchain can include one or more of the nodes, where the details can be abstracted as to higher-level services).

The identity of the nodes, and the blockchains which they replicate, can be maintained by a blockchain node manager 480. The blockchain node manager 480 can distribute a read or write request from the protocol/hash manager 464 to the appropriate nodes 476 in a given blockchain.

The blockchain platform layer 472 can also be in communication with a blockchain manager service 484, which can include a blockchain broker 488 and a blockchain database 492. The blockchain broker 488 can be used, such as by an administrator, to add or remove nodes from a blockchain, to locate or instantiate new blockchains, to remove blockchains, and to monitor the status of blockchains (for example, the number, identities, and network locations of nodes in the blockchain, the number of blocks in the blockchain, or the number of writers in the blockchain). Information about the configuration of the blockchains can be stored in the database 492.

Blockchain transactions written using the blockchain framework 420 can include various details about the source transaction. Transactions can include different information for different blockchains (e.g., networks of blockchain nodes 476) and depending on a particular workflow. Blockchain transaction record 496 is provided as an example of types of information that can be included in a blockchain transaction. In practice, blockchain transaction records can include more, less, or different information that shown in the blockchain transaction record 496. If a blockchain transaction includes information for less than all of the fields 498 (e.g., 498a-498k), the corresponding field can be left blank, or can include a null value indicating that the field is not used or valid for the particular blockchain transaction.

Blockchain transaction record 496 includes an event type field 498e, a timestamp 498f, a document hash value 498g, a first public key 498i, and a second public key 498j, which may be at least analogous to the correspondingly titled fields of blockchain records 264, 280 of FIG. 2. However, the event type field 498e can be selected from a greater number of options, such as various categories of workflow steps (e.g., decisions, tasks, approvals, reviews, etc.).

The blockchain transaction record 496 can include a transaction ID 498a. The transaction ID 498a can be a unique identifier for the particular blockchain transaction record 496. Records can be maintained, such as in the database 468 or another store, that link transaction IDs 498a to other parameters, such as a particular document hash value 498g or a particular document subject (e.g., a particular subject of a workflow 412, such as a particular individual or entity). The blockchain transaction record 496 can include a subject identifier 498b. The subject identifier 498b can identify a particular subject associated with a workflow, such as a particular individual, a particular business (e.g. a supplier or customer), or another subject that may be associated with multiple workflows. For instance, a particular employee may be associated with various workflows (such as an onboarding workflow, a promotion workflow, an evaluation workflow, a payroll workflow, etc.). Including a subject ID 498b can allow transaction records 496 from multiple workflows to be retrieved for a particular subject.

The blockchain transaction record 496 can include a workflow ID 498c, which can associate the record with one or more workflows 412, and a workflow element ID 498d, which can be used to associated the record with a particular element 414 of a particular workflow (e.g., a particular step 414a or decision 414b of a workflow).

In addition to the hash value 498g of a document, the blockchain transaction record 496 can include a field 498h indicating a location of the document, such as a network location of the document or otherwise providing information useable to locate the document, such as on a document management system. The location field 498h can be particularly useful when a document is to be accessed by different entities, where the document is not sent between the entities are part of a transaction that produces the transaction record 496. Even if the location field 498h is included, access to the document can be restricted by requiring suitable permission to access the document or by encrypting the document.

The blockchain transaction record 496 can include a user ID 498k. The user ID 498k can be used to identify a particular individual associated with the transaction record. For instance, while the public key 498i may identify a particular company associated with the transaction record 496, the user ID 498k may identify a particular employee of the particular company who took an action that caused the transaction record 496 to be written to the blockchain.

Example 6

Figure 5:
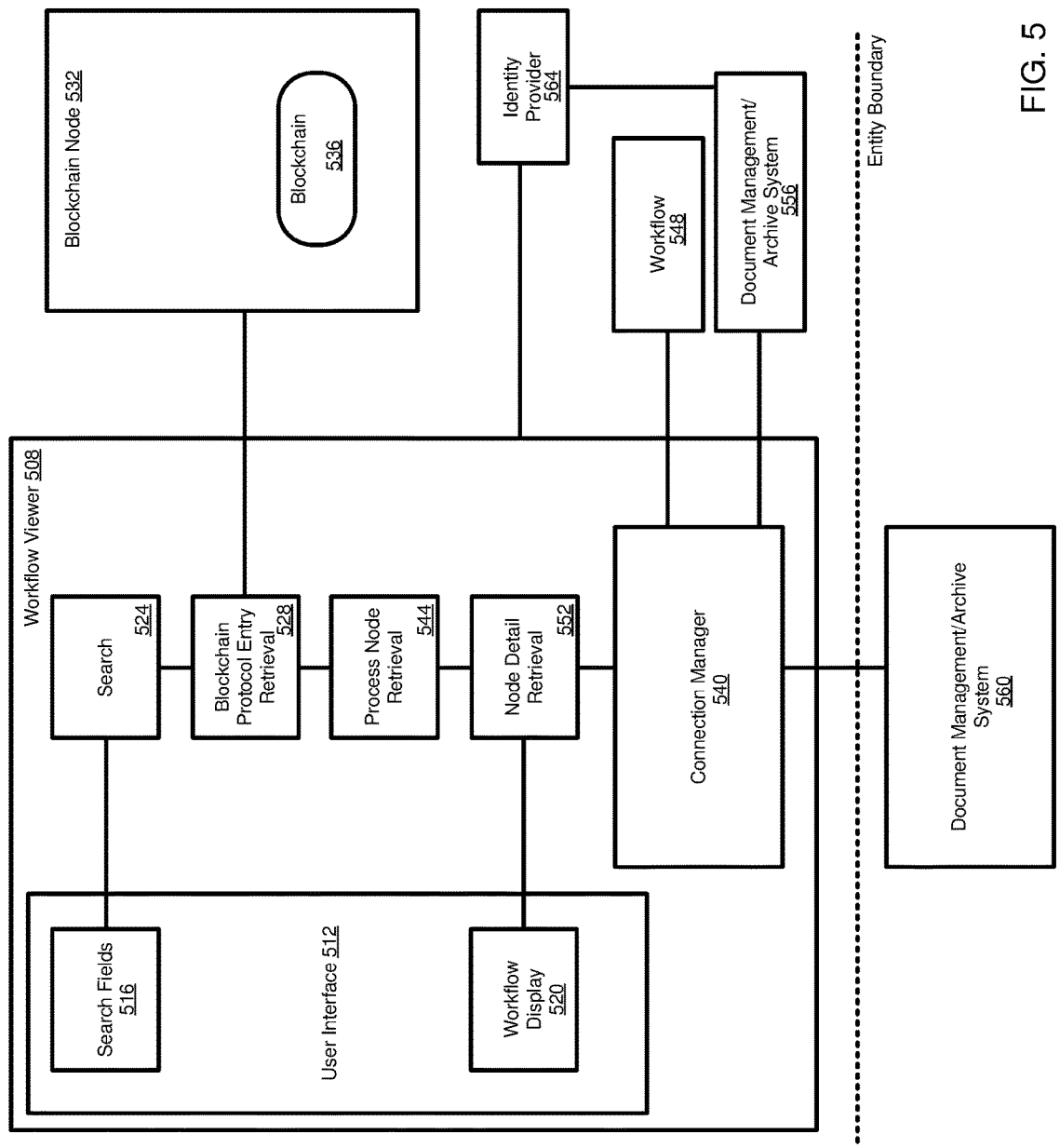
FIG. 5 is a block diagram illustrating components of a workflow viewer that can provide a view of workflow and document actions written in blockchain transaction records.

Example Architecture for Workflow Visualization that Includes Information Recorded in a Blockchain FIG. 5 illustrates an example architecture 500 that can be used to implement a workflow (or process) viewer 508. The workflow viewer 508 can be implement at least a portion of the functionality of the workflow manager 408 of FIG. 4.

The workflow viewer 508 can include a user interface 512, which provides functionality for a user to enter information for search fields 516 and to generate a workflow display 520. The workflow display 520 can include various features discussed in conjunction with the workflow 412 of FIG. 4, including providing a display of at least a portion of workflow elements (such as depending on the permission for a particular user) and information related thereto, such as information as to which workflow elements have been completed or are in an open, or uncompleted status, the identity of individuals, offices, or entities associated with process elements (including identifying such individuals, offices, or entities that have completed a workflow element, or are responsible for completing a workflow element), information regarding the sending, receiving, creation, or modification of documents, and links to access documents (if a user has sufficient authorization).

The search fields 516 can provide input to a search component 524. The search component 524 can format information from the search fields 516 into an appropriate query for processing by a blockchain. The query can be sent from the search component 524 to a blockchain protocol entry retrieval component 528. The retrieval component 528 can cause the query to be executed against a node 532 that includes at least the relevant portion of the relevant blockchain 536. In a particular example, the query from the search component 524 includes information sufficient to identify the appropriate node 532 and blockchain 536, such as by the blockchain protocol entry retrieval component 528 requesting such information from a connection manager 540. In particular examples, the retrieval node 528 or the connection manager 540 can be in communication with other components to facilitate information retrieval from a blockchain 536, such as one or more components of the blockchain framework 420 or the blockchain service 454.

The search fields 516, and the workflow display 520, can be in communication with a process node retrieval component 544. The process node retrieval component 544 can retrieve information regarding a workflow, and its constituent workflow elements, from a workflow component 548, including through the connection manager 540. The workflow component 548 can be the workflow manager 408 of FIG. 4. For particular queries, the process node retrieval component 544 can retrieve information regarding a particular workflow modeled in the workflow component 548.

The search fields 516, and the workflow display 520, can be in communication with a node detail retrieval component 552. The node detail retrieval component 552 can retrieve detailed information regarding a node, or workflow element, of a workflow being displayed in the workflow display 520. For example, the node detail retrieval component 552 can retrieve information regarding the operations involved in a node, the individuals, offices, or entities associated with the node, the status of the node (e.g., complete or incomplete), records (e.g., blockchain transactions) associated with the node (such as indicating the completion of a task, or the sending or receiving of a document), documents associated with the node, and the status of documents associated with the node (e.g., whether the document was created, deleted, modified, sent, or received). In carrying out its operations, the node detail retrieval component 552 can retrieve information from the workflow component 548, and from a document management/archive system 556, such as through the connection manager 540.

The connection manager 540 can provide access to the workflow component 548 and the document management/archive system 556 to various component of the workflow viewer 508. The connection manager 540 can also provide access to a document management/archive system 560 of another computing system or environment, which can be a computing system or environment associated with another entity (e.g., another office or company) associated with the workflow. That is, the workflow may be carried out by multiple offices and/or companies, and, at least in some cases, a document may be in the possession of one office or company, but in the position of another company. However, a workflow being displayed in the workflow display 520 can include a link to, or identifier of, a remotely located document, such that the document can be retrieved through the connection manager 540, provided that a user making a document request has suitable permissions. Or, a workflow action taken by one entity can be viewable in a workflow of another entity (which can be the same workflows or different workflows).

The architecture 500 can include an identity provider 564. The identity provider 564 can be accessed by various components of the architecture 500, such as the document management/archive system 556 and the workflow viewer 508. The identity provider 564 can be used to determine whether a user is authorized to access particular workflows or documents, what information should be displayed to the user (e.g., based on the user's role in the workflow), and what actions may be taken by a user. The identity provider 564 can also be used to provide and store public and private encryption keys for various entities and users associated with the workflow viewer 508.

Example 7

Figure 6:
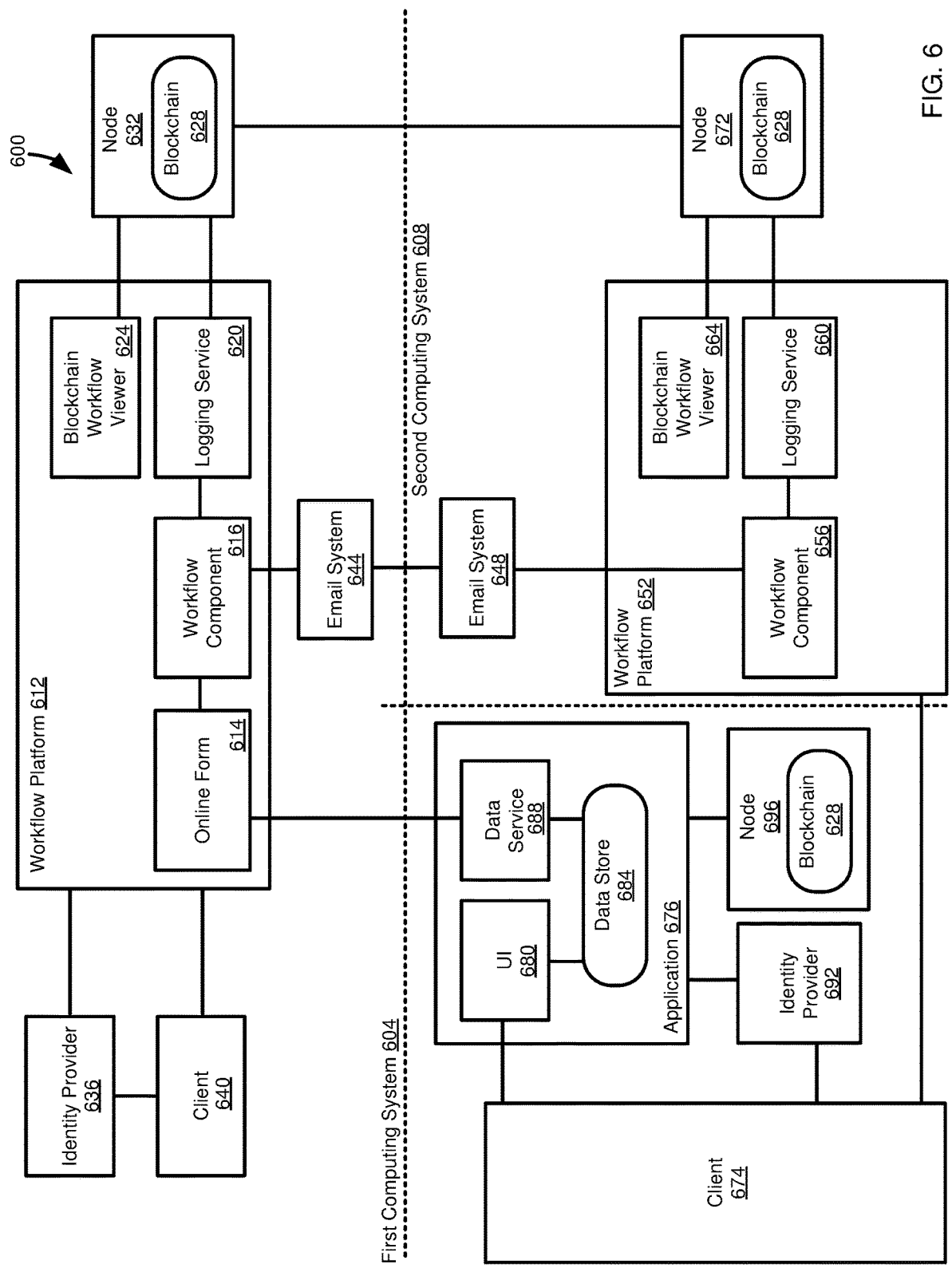
FIG. 6 is a diagram schematically depicting an architecture that allows documents to be transferred between first and second computing systems, where document actions, including document transfers, and workflow actions, can be recorded in a blockchain.

Example Communication of Documents and Workflow Activity Between First and Second Computing Systems with Workflow and Document Activity Recorded in a Blockchain FIG. 6 illustrates an architecture 600 where two offices (such as two offices in the same entity, such as the same company) or two entities (such as a first office of a first entity and a second office of a second entity) are each involved in a common workflow. These scenarios are described as occurring between a first computing system or environment 604 (e.g., the first office or first entity) and a second computing system or environment 608 (e.g., the second office or second entity).

The first computing system 604 includes a workflow platform 612. The workflow platform 612 provides an online form 614. That is, for example, the workflow platform 612 can include suitable functionality for accessing web content to provide the form and server capabilities. The workflow platform 612 also includes a workflow component 616, which can be analogous to, or include at least certain features of, the workflow manager 408 of FIG. 4 or the workflow viewer 508 of FIG. 5.

The workflow platform 612 can be in communication with a logging service 620. The logging service 620 can provide functionality for writing and reading blockchain transactions associated with the workflow, such as to record when a document is sent or received, to record when other workflow steps have occurred, or to verify what actions have occurred during the workflow. The logging service 620 can be at least generally analogous to, or include at least some of the functionality of, the logging service 430 or the blockchain logging service 458 of FIG. 4

The workflow platform 612 can include a workflow viewer 624, which can be at least generally analogous to the workflow viewer 508 of FIG. 5. The workflow viewer 624 can include, or can be in communication with another component that provides, functionality for reading transactions recorded in a blockchain 628, such as by communicating with a node 632 that includes a copy of at least the relevant portion of the blockchain.

The workflow platform 612 can communicate with an identity provider 636. The identity provider 636 can supply credentials for users of the workflow platform 612, including credentials specifying what workflows a user has access to, what information in a workflow a user may view, what actions a user, such as a user of a client device 640, may take with respect to workflow elements, and what documents a user may view, or retrieve tracking information for (e.g., recorded in the blockchain 628). In other cases, the user may be an individual whose information is being processed in a workflow, in which case the user can be allowed to access the online form 614, but not other components of the workflow platform 612. Or, a user can be allowed access to a particular workflow, such as read-only access to workflows of which they are a subject.

The identity provider 636 may also store public and private key information for the user. The identity provider 636 may also communicate directly with the client device 640. In particular examples, the identity provider 636 can be at least analogous to, or include at least a portion of the functionality of, the identity provider 450 of FIG. 4 or the identity provider 564 of FIG. 5.

The workflow component 616 can be in communication with an email system 644, or another communication mechanism for sending or receiving data between the first computing system 604 and the second computing system 608. In at least some implementations, the email system 644, or other communication mechanism, is capable of sending secure communications (including certified), such as sending encrypted communications. In a particular example, the email system 644 is a certified email system, such as a certified email system using the protocol described in RFC 6109 (and used in Italy's Posta elettronica certificata).

The email system 644 of the first computing system 604 communicates with an email system 648 of the second computing system 608, where the email system 648 can be at least analogous to the email system 644. The email system 648 is in communication with a workflow platform 652 of the second computing system 608, where the workflow platform can include a workflow component 656, a logging service 660, and a workflow viewer 664, which can be at least generally analogous to the correspondingly titled components 616, 620, 624 of the first computing system 604. The logging service 660 and workflow viewer 664 can access (e.g., read and/or write) information in the blockchain 628, hosted on a node 672. Information is replicated between the nodes 632, 672 according to a protocol associated with the blockchain.

A client 674, such as a client associated with an employee of an entity associated with the second computing environment 608 (e.g., an employee of a company) may access the workflow platform 652 to view a workflow and enter workflow transactions (which are then entered in the blockchain 628). The client 674 can also access an application 676, which can include a user interface 680 that allows a user to view information stored in a data store 684, where the data store 684 can include information submitted via the online form 614, and optionally other information relevant to a workflow. The data can be retrieved from the online form 614, and stored in the data store 684, by a data service 688.

An identity provider 692 can communicate with the application 676, the client 674, and the workflow platform 652, such as to supply public and private keys for read and write operations, and to determine which records of the data store 684, and workflows, workflow elements, and documents of the workflow of the workflow component 656 the user may access, and what actions the user may take.

Example 8

Example Blockchain Query

Figure 7:
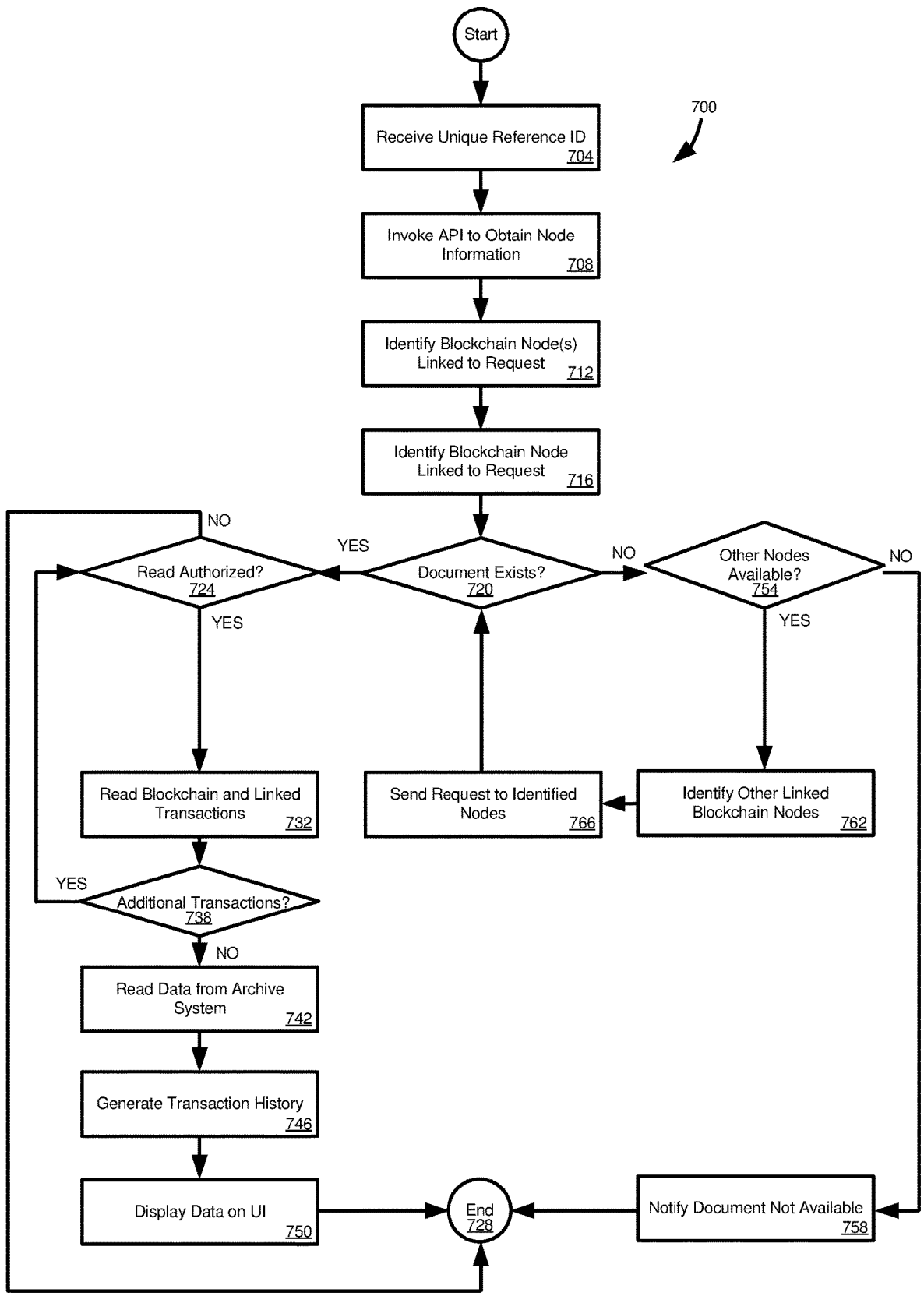
FIG. 7 is a flowchart illustrating operations for retrieving blockchain transaction records associated with a document, if the records exist and a user is authorized to view them.

FIG. 7 is a flowchart of a method 700 for retrieving blockchain transactions associated with a document. The method 700 can be carried out by, for example, the document tracking service 324 of FIG. 3, the process viewer 428 of FIG. 4, the workflow viewer 508 of FIG. 5, or the blockchain workflow viewer 624 or the blockchain workflow viewer 664 of FIG. 6.

At 704, a unique reference identifier is received, such as from a user. The reference identifier, such as a document hash value, can be associated with a particular document. At 708, a blockchain service API is invoked to determine an underlying blockchain technology (such as a particular protocol or a particular blockchain ID) associated with the reference identifier. An API is invoked at 712 to determine nodes that include at least a portion of the blockchain identified at 708. At 716, it is determined what blockchain node is associated with a particular individual (or an office or an entity associated with the individual).

The node identified at 716 is queried at 720 to determine whether the referenced document exists. For example the blockchain of the node can be queried to determine whether records exist for a hash value associated with the document (which hash value can be the identifier received from the user, or a hash value retrieved based on the identifier provided by the user). If one or more records for the document are identified at 720, it is determined at 724 whether the user is authorized to read transaction records associated with the document (and, optionally, whether the user is allowed to access the document itself). 724 can involve reading credentials associated with the user provided by an identity provider.

If the user is not authorized to view the document transaction records, the method 700 can end at 728. If the user is authorized to view the document transaction records, details of transactions involving the document are read from the blockchain at 732. In some cases, transactions can be linked to a particular document (e.g., via one or more entries in a particular field of a blockchain transaction record), and reading transactions for the document can include reading transaction for linked transactions (where a linked transaction can be, for example, a workflow element or a related document, such as a document created as part of a workflow).

It is determined at 738 whether any additional transactions are available to be read from the blockchain. If additional transactions exist, the method 700 can return to 724 to determine whether the user is authorized to view the details of the additional transactions. If no additional transactions are determined at 738 to be available, the method 700 proceeds to retrieve any documents for identified transactions at 742, provided that the user is authorized to view the documents. A transaction history for the identified transactions is generated at 746. For example, data from the transactions can be extracted and formatted for a user display. At 750, the transaction history can be displayed using a user interface. The method 700 can then end at 728.

If it was determined at 720 that the referenced document does not exist on the identified node, the method 700 can proceed to determine at 754 whether additional nodes are available that replicate the blockchain. If no other nodes are available, a notification can be generated at 758 that the document does not exist, and the method can end at 728. If additional nodes are available, they can be identified at 762. The retrieval request can be sent to the additional nodes at 766, and the method can proceed to 720 to determine if the document exists on the additional nodes.

In some cases the method 700 can be performed as shown, but the reference identifier is for a particular workflow or a particular workflow element and the records, including records for any documents associated with the workflow or particular workflow element, are processed in an analogous manner as shown in FIG. 7.

Example 9

Example Query of Blockchain and Document Management System

Figure 8:
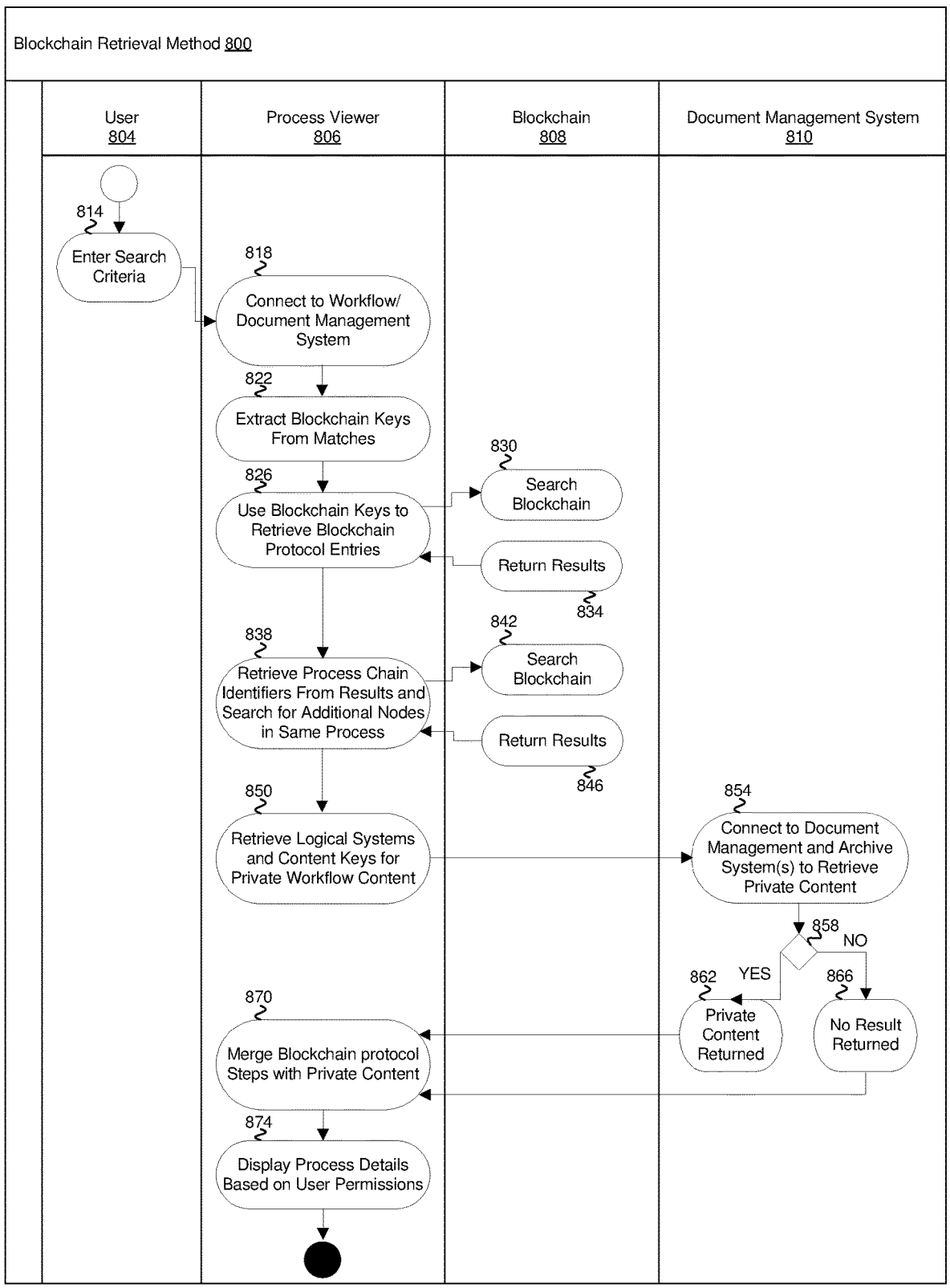
FIG. 8 is an activity diagram illustrating operations at a user, a process viewer, a blockchain, and a document management system in querying a blockchain to determine if transaction records exist for a document, and determining whether additional content, such as the document, can be retrieved from the document management system.

FIG. 8 is an activity diagram flowchart of operations occurring in a method 800 of retrieving blockchain transaction records in response to a user query. The method 800 illustrates operations occurring at a user 804 (such as commands entered through a client computing device), a process viewer 806 (e.g. an element of the document flow client 228a, b of FIG. 2, the visualization interface 328 of FIG. 3, the process viewer 428 of FIG. 4, the workflow viewer 508 of FIG. 5, or the blockchain workflow viewer 624 or the blockchain workflow viewer 664 of FIG. 6), a blockchain 808 (e.g. the blockchain 116 of FIG. 1, the blockchain 252 of FIG. 2, the blockchain 312 of FIG. 3, a blockchain formed by the blockchain nodes 476 of FIG. 4, the blockchain 536 of FIG. 5, or the blockchain 628 of FIG. 6), and a document management system 810 (e.g. the document processing system 112 of FIG. 1, the document processing system 220a, b or the document flow client 228a, b of FIG. 2, the document processing system 320 or the document tracking service 324 of FIG. 3, the document management system 446 of FIG. 4, the document management/archive system 556 of FIG. 5, or the data store 684 of FIG. 6).

The user 804 enters search criteria at 814. The search criteria can be, for example, a document identifier (including a hash value), a workflow identifier, a workflow element identifier, a workflow element type, and the like. The search criteria are sent from the user 804 to the process viewer 806, and at 818 the process viewer can connect with the document management system 810 and the blockchain 808, and search criteria are compared with a workflow model and the document management system accessed in order perform the search. At 822, the process viewer 806 extracts blockchain keys (e.g., public keys, workflow or workflow element identifiers, document hash values, or combinations thereof, depending on the search criteria received at 814) for any workflow elements or documents determined to be associated with blockchain transaction records. The blockchain keys are used to find matching blockchain transaction entries at 826.

The query is sent to the blockchain 808 by the process viewer 806, and the blockchain is searched at 830. Any matching results are returned by the blockchain 808 to the process viewer 806 at 834. At 838, any process chain identifiers in the results returned at 834 are identified. That is, the blockchain transactions may identify other workflows, workflow elements, or documents that are linked to a retrieved result. A request to retrieve these linked transactions can be sent from the process viewer 806 to the blockchain 808, and the blockchain searched at 842. Search results are returned from the blockchain 808 to the process viewer 806 at 846.

As described above, typically, the blockchain transaction records include information regarding a document's history (or relating to a workflow or workflow element), but do not include a copy of the information in the document. Accordingly, at 850, the process viewer 806 can retrieve logical and content keys for documents, or any information desired to be displayed that is not recorded in a blockchain transaction or already present in a workflow display. These logical and content keys are sent from the process viewer 806 to the document management system 810.

At 854, the document management system 810 attempts to retrieve content indicated by the logical and content keys. It is determined at 858 whether the user is permitted to access the indicated content. If the user is authorized, the additional content is returned to the process viewer 806 at 862. If the user is not authorized to access the additional content, no result, and optionally an error message, is returned to the process viewer 806 at 866.

At 870, the process viewer 806 merges any additional content sent by the document management system 810 at 862 with the blockchain transaction data sent from the blockchain 808 at 846. The process viewer 806 displays all or a portion of the merged data to the user at 874, based on permissions associated with the user (where the permissions can also determine a particular display layout).

Example 10

Example Blockchain Record Displays

Figure 9:
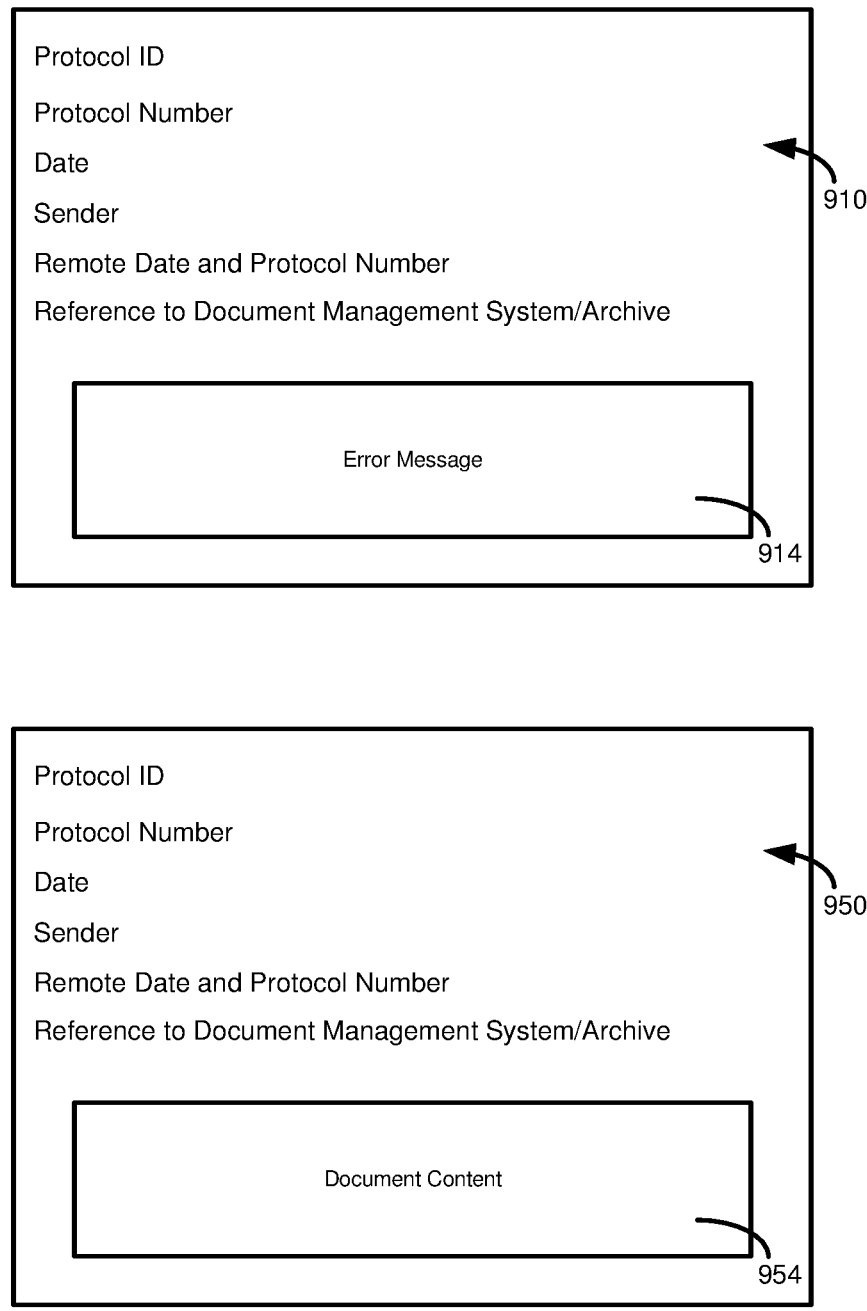
FIG. 9 presents example displays that can be presented for a blockchain transaction record when an underlying document may and may not be presented along with information from the blockchain transaction record.

FIG. 9 illustrates example output displays 910, 950 that may be produced according to aspects of the present disclosure, including the method 700 of FIG. 7 and the method 800 of FIG. 8. The output display 910 can represent a display that is produced when a user is permitted to access tracking information for a document, but not the underlying contents of the document. In order to view the display 910 however, at least in some aspects, a user must be permitted to access a hash value of the document even to view tracking information associated with a document. The display 910 can include an error message 914, such as an error message indicating that the user is not permitted to view the document (or, in other cases, that the document cannot be found).

In contrast, the display 950 can include a display 954 of the document content, if the user is permitted to access the contents of the document and the document can be located. Both displays 910, 950 can display information associated with a blockchain transaction, such as a primary identifier (such as, for example, an identifier of a document or a workflow element), a protocol number (which can be, for example, a workflow identifier), a date the transaction occurred, an identifier of a receiving party (in the event the transaction is for the sending or receiving of a document, or control or responsibility in a workflow was transferred between parties), and a reference to a document management or archive system (which can be used, for example, to retrieve the document, assuming the user is appropriately permissioned).

A display 910, 950 can include more, less, or different information than shown, including depending on the nature of a transaction record being displayed or summarized.

Example 11

Example Workflow Detail Screen

Figure 10:
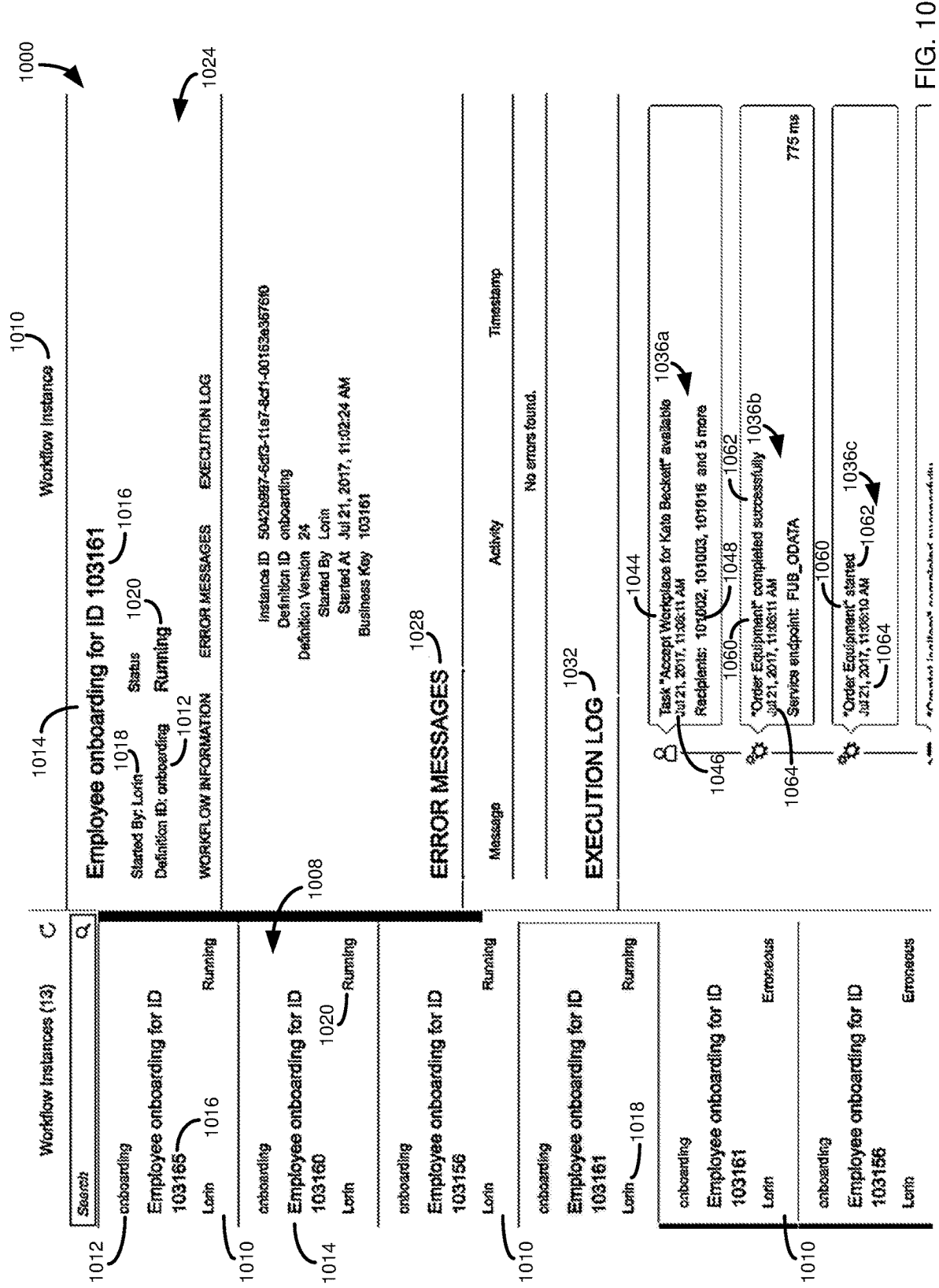
FIG. 10 is an example screen illustrating workflow details, including execution log entries that may include information retrieved from blockchain transaction records for a workflow.

FIG. 10 presents an example display 1000 where workflow information can be displayed to an end user. The display 1000 can be an example of a display of the visualization interface 328 of FIG. 3, a display of the workflow manager 408 of FIG. 4, the workflow display 520 of FIG. 5, or a display of the blockchain workflow viewer 624 or the blockchain workflow viewer 664 of FIG. 6.

The display 1000 includes a panel 1008 illustrating various instances 1010 of a particular workflow, such as a workflow associated with the hiring of a new employee. Each instance 1010 can be associated with a workflow descriptor 1012, which can be a name or other designator for the particular workflow, a title 1014, which can include an identifier 1016 of the particular employee associated with the instance, a name of a party 1018 currently responsible for the workflow instance 1010, and a status 1020 of the workflow instance (e.g., running, terminated, erroneous, and the like).

Panel 1024 provides details for a particular workflow instance 1010. In addition to the information 1012, 1014, 1016, 1018, 1020 presented in the panel 1008, the panel 1024 includes details 1028 for any errors that may be associated with the instance, and an execution log 1032. The execution log 1032 can list individual activities 1036 that have taken place in the instance 1010. For example, the execution log 1032 includes an entry 1036*a* indicating that a first workflow task was initiated, including a title 1044 of the task, a time 1046 the task was started, and the identities 1048 of other users who were notified of the task. Entries 1036*b*, 1036*c* include a title 1060 of a particular activity associated with the task of the entry, an activity status 1062 (e.g., "started," "completed"), and a time 1064 associated with the activity status.

Example 12

Figure 11:
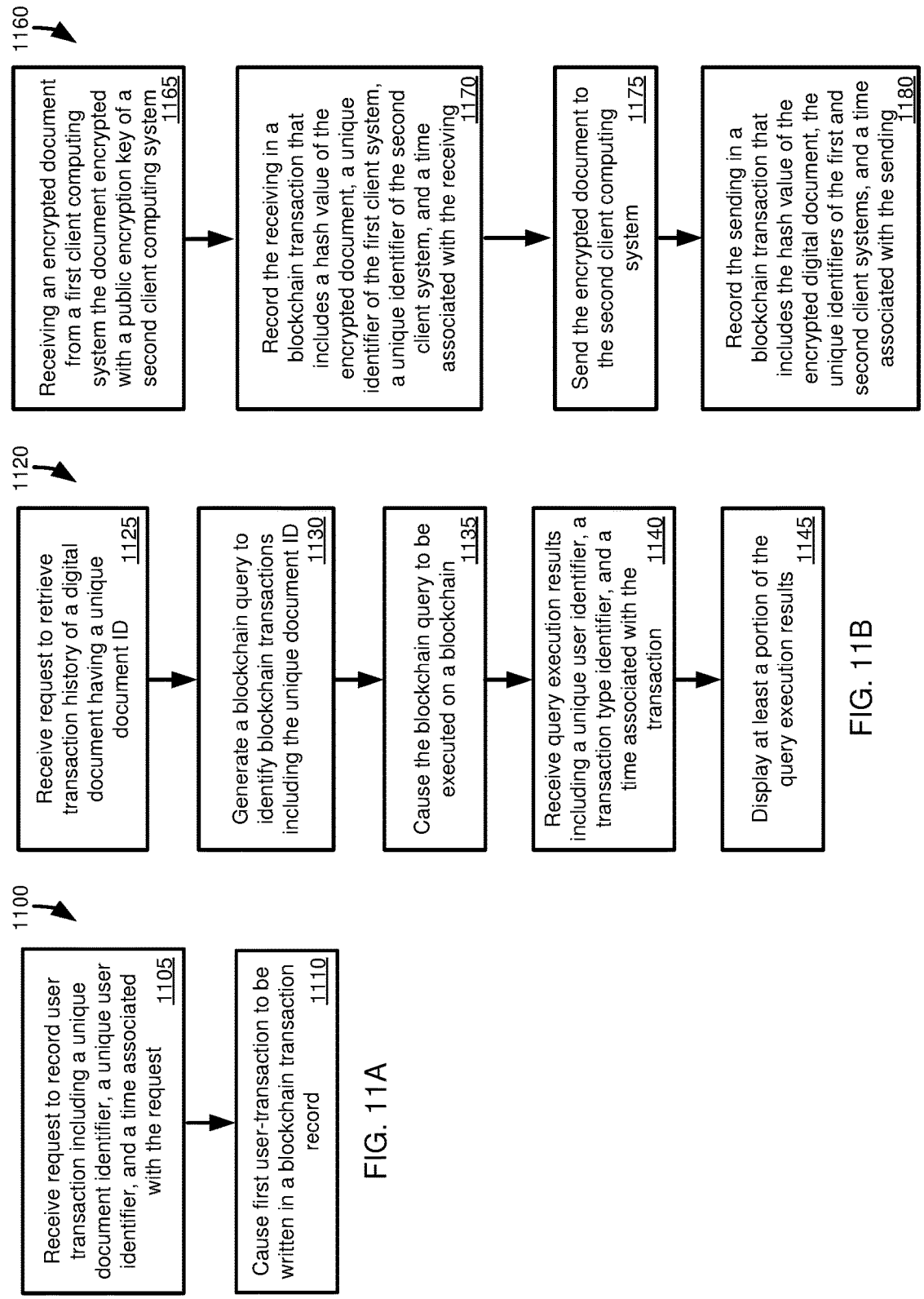
FIG. 11A is a flowchart of an example method of writing a blockchain transaction record that includes a unique document identifier, a unique user identifier, and a timestamp.
FIG. 11B is a flowchart of an example method of retrieving blockchain transaction records associated with a digital document using a unique document identifier of the document.
FIG. 11C is a flowchart of an example method of receiving an encrypted digital document from a first client computing system and sending the encrypted digital document to a second client computing system, where the sending and receiving are recorded in blockchain transactions.

Example Methods of Recording Document and Workflow Information In, and Retrieving Such Information from, a Blockchain FIG. 11A is a flowchart of an example method 1100 of recording a first user-transaction with a document (such as with a digital version of a physical document) in a blockchain. In various examples, the user-transaction can be an action in sending or receiving the document, or a workflow action that involves the document (such as approving the document or generating an analysis or summary of the document). The request to record the first user-transaction is received at 1105. The request includes a unique document identifier generated from document content, such as a hash value of the document, a unique identifier of a user requesting the action, and a time associated with the request, such as a time the document was sent or received. At 1110, the first user-transaction is caused to be written in a blockchain transaction record.

FIG. 11B is a flowchart 1120 of an example method of retrieving a transaction history of a digital document (such as a digital version of a physical document) having a unique document identifier generated from document content, such as a hash value. At 1125, a request is received to retrieve the transaction history of the digital document. The request includes the unique document identifier. A blockchain query is generated at 1130, where the query is to identify blockchain transactions having the unique document identifier. The blockchain query is caused to be executed on a blockchain at 1135. At 1140, query execution results are received. The query execution results include a unique user identifier (such as an identifier of a user who requested a transaction to be recorded in the blockchain, or who is otherwise associated with the transaction), a transaction type identifier, and a time associated with the transaction (such as a time an action associated with the transaction was requested or was executed). At least a portion of the query execution results are displayed at 1145.

FIG. 11C is a flowchart of a method 1160 for receiving and sending an encrypted document (such as encrypted digital document, which can be a digital version of a physical document), where the receiving and sending are recorded in a blockchain. At 1165, the encrypted document is received from a first client computing system. The document is encrypted with a public encryption key of a second client computing system. At 1170, the receiving is recorded in a blockchain transaction. The blockchain transaction includes a hash value of the encrypted document (e.g., a hash value of the unencrypted digital document), a unique identifier of the first client computing system, a unique identifier of the second client computing system, and a time associated with the receiving. The encrypted digital document is sent to the second client computing system at 1175. At 1180, the sending is recorded in a blockchain transaction. The blockchain transaction for the sending include the hash value of the digital document, the unique identifiers of the first and second client computing systems, and a time associated with the sending.

Example 13

Computing Systems

Figure 12:
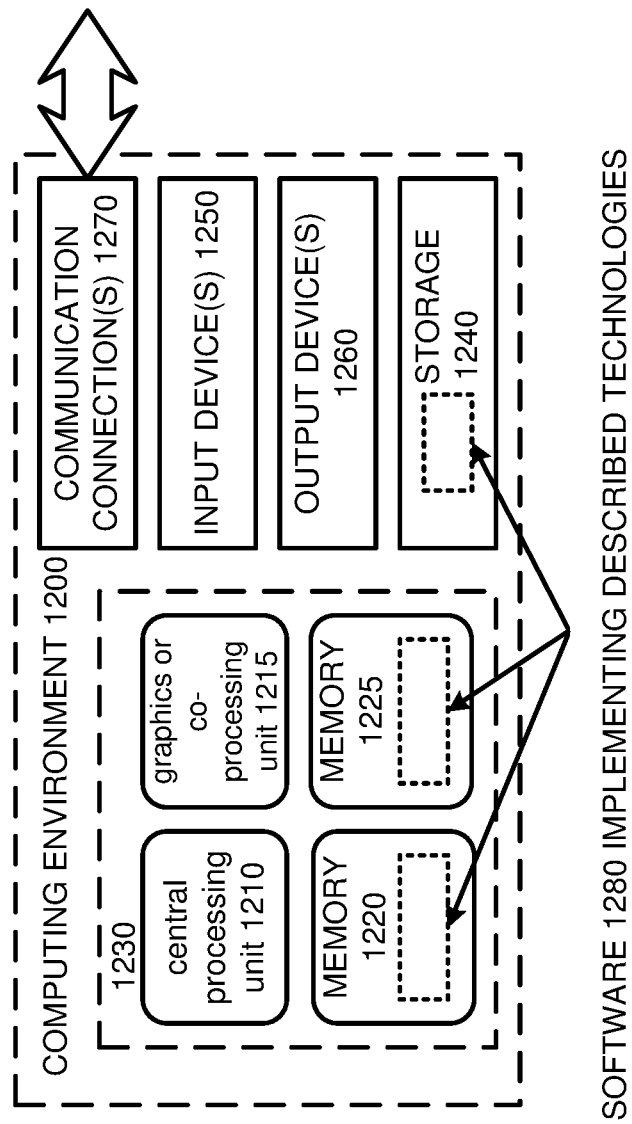
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing components described in Examples 1-12. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14

Cloud Computing Environment

Figure 13:
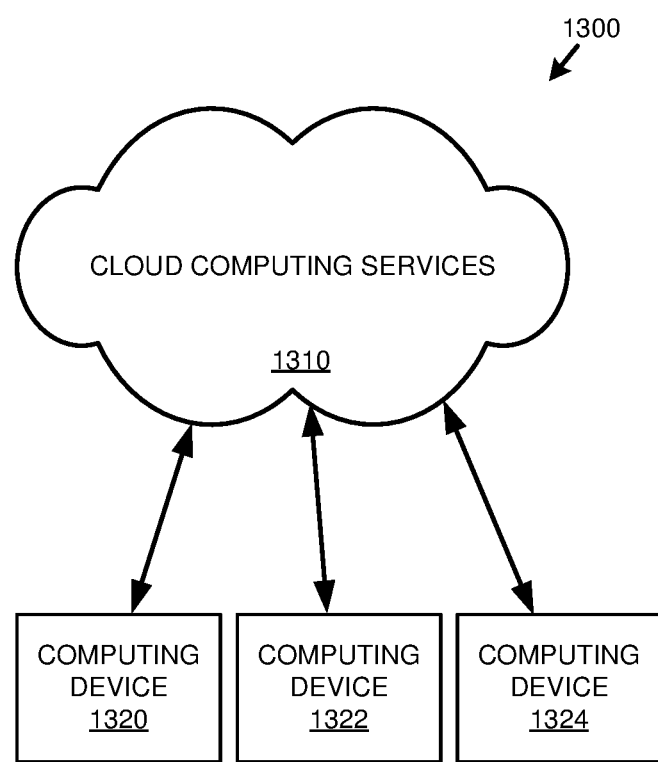
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Example 15

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C #, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   memory;
   one or more processing units coupled to the memory; and
   one or more non-transitory computer readable storage media storing instructions that, when executed, cause the computing system to perform operations comprising:
   receiving an encrypted digital document from or by a first client computing system, the digital document encrypted with a public encryption key associated with a second client computing system;
   in response to, and contemporaneous with, the receiving, recording the receiving in a first blockchain transaction, the first blockchain transaction comprising a hash value of an unencrypted version of the encrypted digital document, a unique identifier of the first client computing system, a unique identifier of the second client computing system, and a time associated with the receiving, wherein the encrypted digital document comprises, and the unique document identifier is a hash value generated from, content of, a digitized version of a physical document, an online form, a database table, a word processing document, a document in a markup language, or a spreadsheet record;
   sending the encrypted digital document to the second client computing system; and
   in response to, and contemporaneous with, the sending, recording the sending in a second blockchain transaction, the second blockchain transaction comprising the hash value of the digital document, the unique identifier of the first client computing system, the unique identifier of the second client computing system, and a time associated with the sending.

2. The computing system of claim 1, the operations further comprising:
   generating the unique document identifier for the digital document by applying a hash function to the document content to generate the hash value.

3. The computing system of claim 1, wherein the unique identifier of the first client computing system comprises a first unique user identifier, the first unique user identifier comprising a public encryption key of a first user of the first client computing system.

4. The computing system of claim 1, wherein the document content is not written in the first blockchain transaction.

5. The computing system of claim 1, the operations further comprising:
   by the first client computing system, digitizing a physical document, wherein the unique document identifier is generated from the digitized physical document.

6. The computing system of claim 1, wherein the first blockchain transaction comprises an identifier for a workflow.

7. The computing system of claim 1, wherein the unique document identifier of the first client computing system comprises a identifier of a first user of the first client computing system and the first blockchain transaction reflects a first step or decision of a workflow comprising a plurality of steps or decisions, the operations further comprising:
   executing a second step or decision of the plurality of steps or decisions of the plurality of steps or decisions of the workflow by a second user; and
   calling a computer-implemented method, the calling resulting in the second blockchain transaction, the second blockchain transaction recording the executing the second step or decision and wherein the unique identifier of the second computing system comprises a unique user identifier for a second user of the second computing system.

8. The computing system of claim 7, wherein the first step or decision comprises sending the digital document to the second user, the first user is a sending party of the digital document, the second step or decision comprises the second user receiving the digital document from the first user, and the second user is a recipient of the digital document.

9. The computing system of claim 1, the operations further comprising:
   generating the unique document identifier for the digital document; and
   encrypting the digital document with a public encryption key of a second user of the second client computing system to provide the encrypted digital document.

10. The computing system of claim 1, wherein the encrypted digital document is encrypted with a public encryption key of a second user of the second client computing system.

11. The computing system of claim 1, wherein the encrypted digital document is encrypted with a public encryption key of a second user of the second client computing system, wherein the sending the encrypted digital document to the second client computing system comprises sending the encrypted digital document to the second user.

12. The computing system of claim 1, wherein the unique document identifier is generated from an electronic record comprising formatted data extracted from a digital version of a physical document.

13. A method, implemented in a computing system comprising a memory and one or more processors, comprising:
receiving a request to retrieve a transaction history of a digital document having document content, the digital document associated with a unique document identifier generated from the document content;
generating a unique document identifier from the hash value generated from, content of, a digitized version of a physical document, an online form, a database table, a word processing document, a document in a markup language, or a spreadsheet record;
generating a blockchain query to identify blockchain transactions comprising the unique document identifier;
causing the blockchain query to be executed on a blockchain;
receiving a plurality of query execution results from the blockchain, each query execution result of the plurality of query execution results comprising a unique user identifier recorded in a corresponding blockchain entry and associated with a user, a transaction type identifier, and a time associated with the transaction, wherein the plurality query execution results comprise a plurality of different types of transaction type identifiers, where a given transaction type identifier identifies a particular element or step of a workflow comprising a plurality of elements or steps; and
displaying at least a portion of the query execution results to a user.

14. The method of claim 13, further comprising generating the hash value of the digital document from the digital document.

15. The method of claim 13, further comprising:
receiving from a user a request to view the digital document;
accessing permissions information of the user;
determining whether the user is authorized to access the digital document; and
displaying or not displaying the digital document based on the determining.

16. The method of claim 13, wherein the digital document comprises, and the unique document identifier is generated from, a digitized version of a physical document, content of an online form, a database table, a word processing document, a document in a markup language, or a spreadsheet record.

17. The method of claim 13, wherein the document content is not returned as part of the plurality of query execution results.

18. The method of claim 17, wherein at least one query execution result of the plurality of query execution results comprises the unique document identifier and an additional document identifier, the additional document identifier generated at least in part from modified document contents, wherein the additional document identifier indicates that the at least one query execution result of the plurality of query execution results is associated with a blockchain entry indicating modification of the document contents.

19. One or more non-transitory computer readable storage media storing computer-executable instructions, that, when executed by a computing system comprising at least one hardware processor and at least one memory coupled to the at least one hardware processor, cause the computing system to perform operations comprising:
receiving an encrypted digital document from a first client computing system, the digital document encrypted with a public encryption key associated with a second client computing system;
in response to, and contemporaneous with, the receiving, recording the receiving in a blockchain transaction, the blockchain transaction comprising a unique document identifier for the digital document, the unique document identifier comprising a hash value of an unencrypted version of the encrypted digital document, a unique identifier of the first client computing system, a unique identifier of the second client computing system, and a time associated with the receiving, wherein the encrypted digital document comprises, and the unique document identifier is generated from content of, a digitized version of a physical document, an online form, a database table, a word processing document, a document in a markup language, or a spreadsheet record;
sending the encrypted digital document to the second client computing system; and
in response to, and contemporaneous with, the sending, recording the sending in a blockchain transaction, the blockchain transaction comprising the hash value of the digital document, the unique identifier of the first client computing system, the unique identifier of the second client computing system, and a time associated with the sending.

20. The one or more non-transitory computer readable storage media of claim 19, the operations further comprising:
generating the unique document identifier for the digital document by applying a hash function to the document content to generate the hash value.

21. The one or more non-transitory computer readable storage media of claim 19, wherein the unique identifier of the first client computing system comprises a first unique user identifier, the first unique user identifier comprising a public encryption key of a first user of the first client computing system.

22. The one or more non-transitory computer readable storage media of claim 19, wherein the document content is not written in the first blockchain transaction.

* * * * *